US012591418B2

(12) United States Patent
Kanungo et al.

(10) Patent No.: US 12,591,418 B2
(45) Date of Patent: Mar. 31, 2026

(54) ELECTRONIC SYSTEM FOR DEVELOPING A MACHINE LEARNING MODEL

(71) Applicant: SAMSUNG ELECTRONICS CO., LTD., Suwon-si (KR)

(72) Inventors: Tapas Kanungo, Redmond, WA (US); Dmitrii Siakov, San Jose, CA (US); Stephen Walsh, Sunnyvale, CA (US); Nehal Bengre, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1128 days.

(21) Appl. No.: 17/566,458

(22) Filed: Dec. 30, 2021

(65) Prior Publication Data

US 2023/0120131 A1 Apr. 20, 2023

Related U.S. Application Data

(60) Provisional application No. 63/256,889, filed on Oct. 18, 2021.

(51) Int. Cl.
G06F 8/34 (2018.01)
G06F 11/3698 (2025.01)
G06N 20/00 (2019.01)

(52) U.S. Cl.
CPC ............ G06F 8/34 (2013.01); G06F 11/3698 (2025.01); G06N 20/00 (2019.01)

(58) Field of Classification Search
CPC .......... G06F 8/34; G06F 11/3698; G06F 8/30; G06F 11/36; G06N 20/00

(Continued)

(56) References Cited

U.S. PATENT DOCUMENTS 7,729,533 B2 6/2010 Sathyanarayana
8,306,940 B2 11/2012 Lee et al.

(Continued)

OTHER PUBLICATIONS

Wang et al. "Detecting Pharmacovigilance Signals Combining Electronic Medical Records With Spontaneous Reports: A Case Study", 2018, pp. 1-11, Online, Retrieved from internet on Apr. 22, 2025, (Year: 2018), <https://www.frontiersin.org/journals/pharmacology/articles/10.3389/fphar.2018.00875/full>.*

*Primary Examiner* — Bradley A Teets
*Assistant Examiner* — Zengpu Wei
(74) *Attorney, Agent, or Firm* — Sughrue Mion, PLLC

(57) ABSTRACT

An electronic system provides visual information to help a development person improve a machine learning model. The visual information includes logic flows, scatter plots, confusion matrices and instances of utterances which are related to poor performance. Guided by the logic flows, the development person is able to trace scatter plots and confusion matrices in order to identify weaknesses of the machine learning model being developed. A user interface help the development person to then specify or indicate a request for additional training data, improved labels or an improved labelling guide. The logic flows, scatter plots and confusion matrices are used iteratively by the development person to repeatedly discover how the machine learning model can be improved and then getting the data to improve the machine learning model. A relatively unskilled person is able to develop a highly effective machine learning model using the logic flows, scatter plots and confusion matrices.

16 Claims, 18 Drawing Sheets

(58) Field of Classification Search
USPC .......................................................... 717/113
See application file for complete search history.

(56)                    References Cited

U.S. PATENT DOCUMENTS

| | | | |
|---|---|---|---|
| 9,992,211 B1 | 6/2018 | Viljoen et al. | |
| 11,556,746 B1 * | 1/2023 | Dasgupta ................ | G06N 20/00 |
| 2008/0154807 A1 | 6/2008 | Chow et al. | |
| 2012/0158623 A1 | 6/2012 | Bilenko et al. | |
| 2018/0018587 A1 * | 1/2018 | Kobayashi ............. | G06N 20/00 |
| 2020/0265301 A1 * | 8/2020 | Burger ................... | G06N 3/084 |
| 2020/0334570 A1 | 10/2020 | Franklin et al. | |
| 2021/0081841 A1 * | 3/2021 | Sikka ..................... | G06N 3/045 |
| 2022/0147862 A1 * | 5/2022 | Swain .................... | G06N 20/00 |
| 2022/0366901 A1 * | 11/2022 | Rathaur ................ | G06F 16/245 |
| 2023/0325463 A1 * | 10/2023 | Matsuoka ............... | G06F 17/18 |
| | | | 708/520 |
| 2024/0378196 A1 * | 11/2024 | Lester .................... | G06N 20/00 |

* cited by examiner

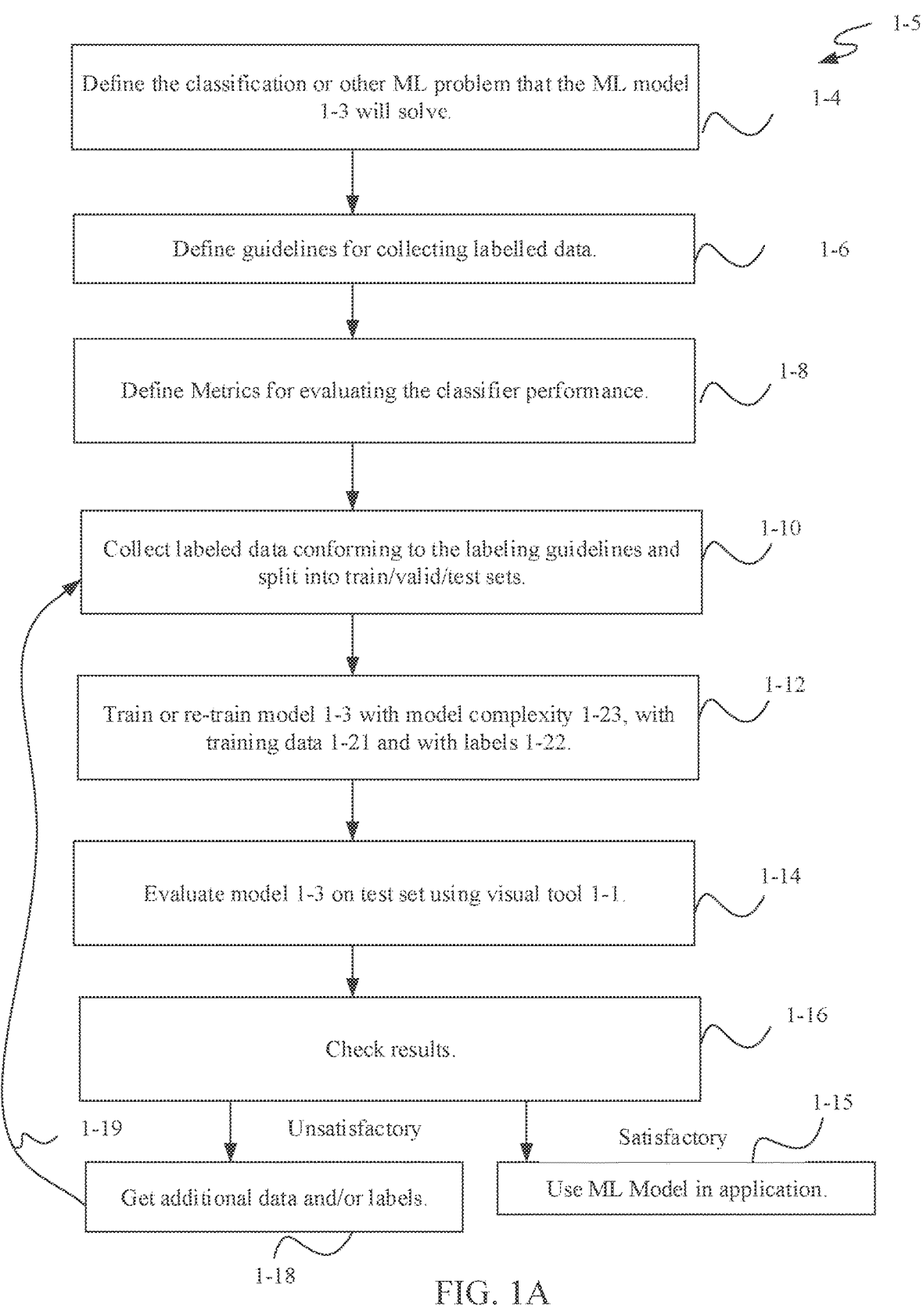

1-5

Define the classification or other ML problem that the ML model 1-3 will solve.                    1-4

Define guidelines for collecting labelled data.                    1-6

Define Metrics for evaluating the classifier performance.                    1-8

Collect labeled data conforming to the labeling guidelines and split into train/valid/test sets.                    1-10

Train or re-train model 1-3 with model complexity 1-23, with training data 1-21 and with labels 1-22.                    1-12

Evaluate model 1-3 on test set using visual tool 1-1.                    1-14

Check results.                    1-16

1-15

1-19       Unsatisfactory                    Satisfactory

Get additional data and/or labels.            Use ML Model in application.

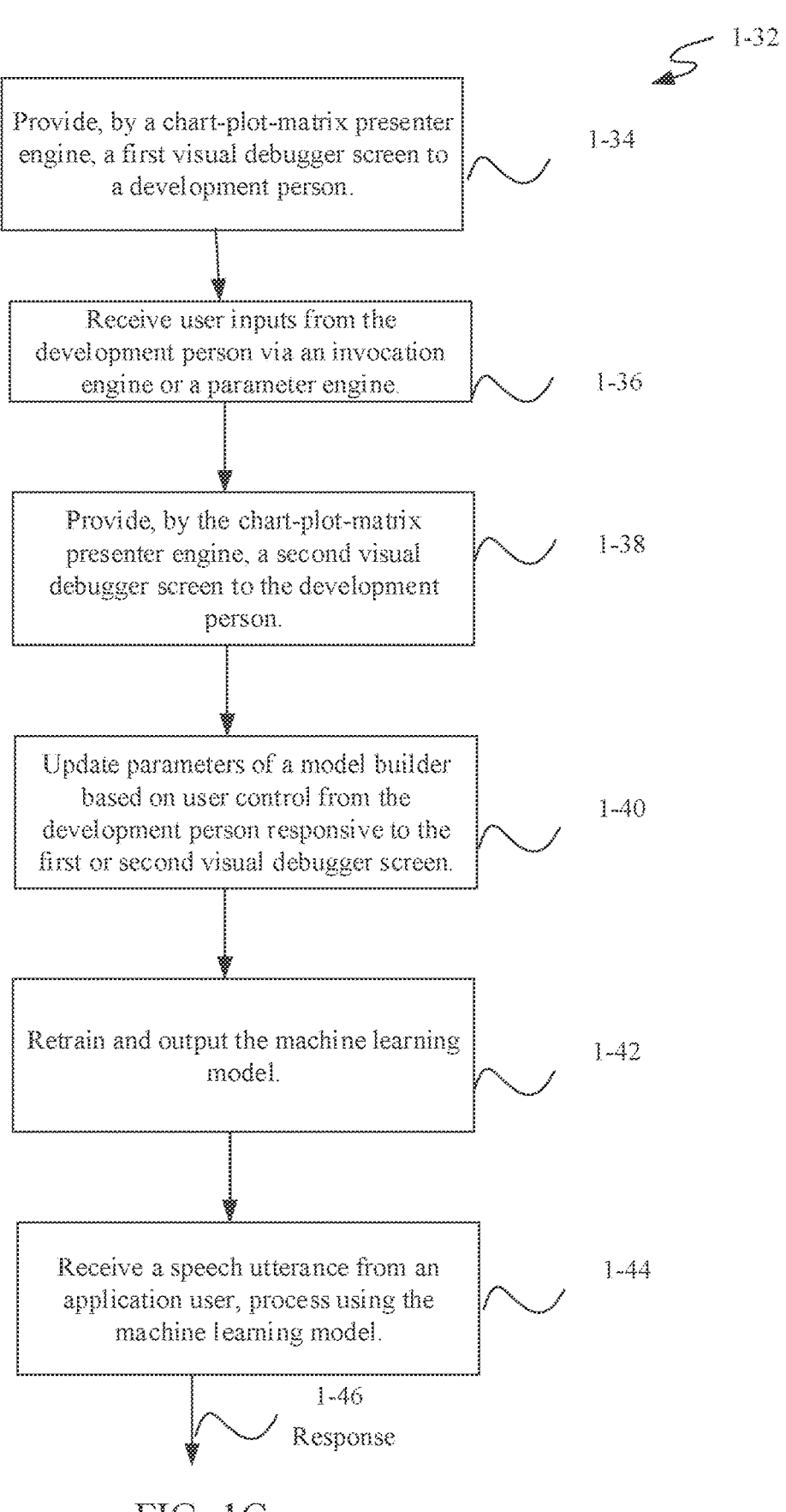

1-32

Provide, by a chart-plot-matrix presenter engine, a first visual debugger screen to a development person.    1-34

Receive user inputs from the development person via an invocation engine or a parameter engine.    1-36

Provide, by the chart-plot-matrix presenter engine, a second visual debugger screen to the development person.    1-38

Update parameters of a model builder based on user control from the development person responsive to the first or second visual debugger screen.    1-40

Retrain and output the machine learning model.    1-42

Receive a speech utterance from an application user, process using the machine learning model.    1-44

1-46
Response

FIG. 1C

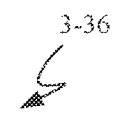
3-36
3-32
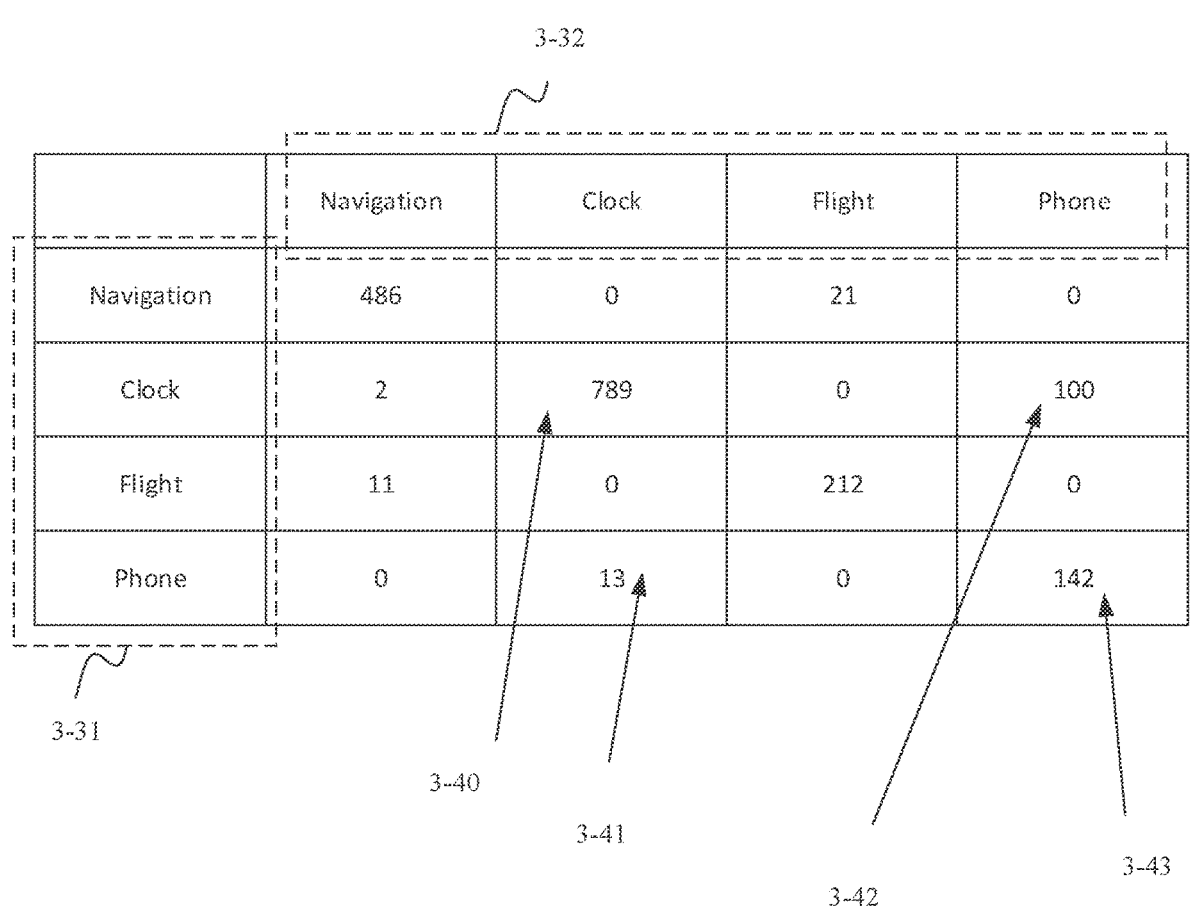
|  | Navigation | Clock | Flight | Phone |
|---|---|---|---|---|
| Navigation | 486 | 0 | 21 | 0 |
| Clock | 2 | 789 | 0 | 100 |
| Flight | 11 | 0 | 212 | 0 |
| Phone | 0 | 13 | 0 | 142 |
3-31
3-40
3-41
3-42
3-43
FIG. 3B 5-1

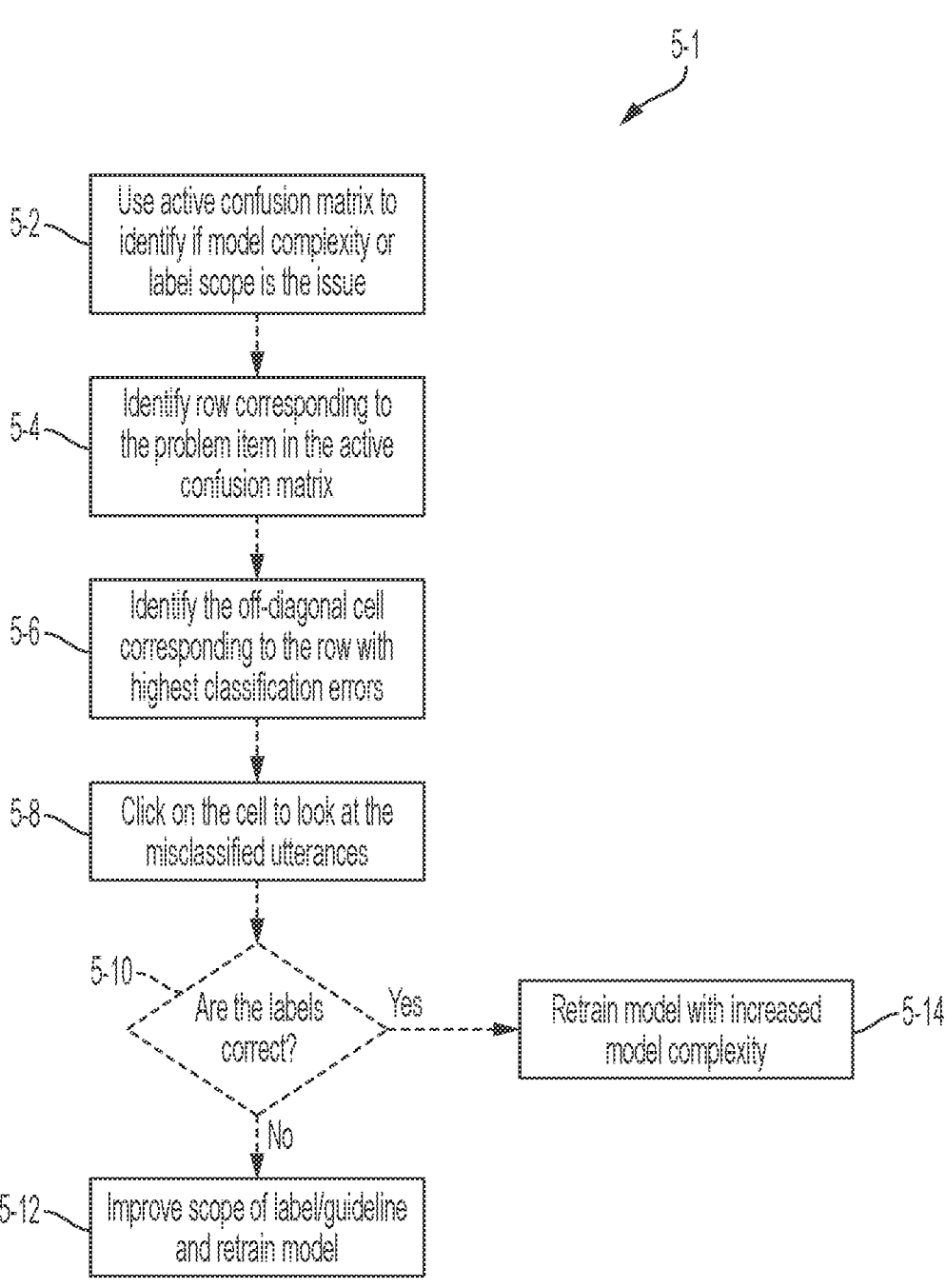

5-2 — Use active confusion matrix to identify if model complexity or label scope is the issue 5-4 — Identify row corresponding to the problem item in the active confusion matrix 5-6 — Identify the off-diagonal cell corresponding to the row with highest classification errors 5-8 — Click on the cell to look at the misclassified utterances 5-10 — Are the labels correct?

Yes → Retrain model with increased model complexity — 5-14

No ↓

5-12 — Improve scope of label/guideline and retrain model

Level
6-10

Flow Chart for Scatter
Plot

Scatter Plot of Router
Data

Level
6-20

Flow Chart for
Confusion Matrix

Router Confusion
Matrix 6-26

Level
6-30

Flow Chart for
Confusion Matrix

Confusion Matrix for
Clock 6-36

Level
6-40

Flow Chart for Scatter
Plot

Scatter Plot
For
Goal Change Alarm
In Clock Capsule 6-46

Level
6-50

Utterance set
For Goal Change
Alarm 6-56

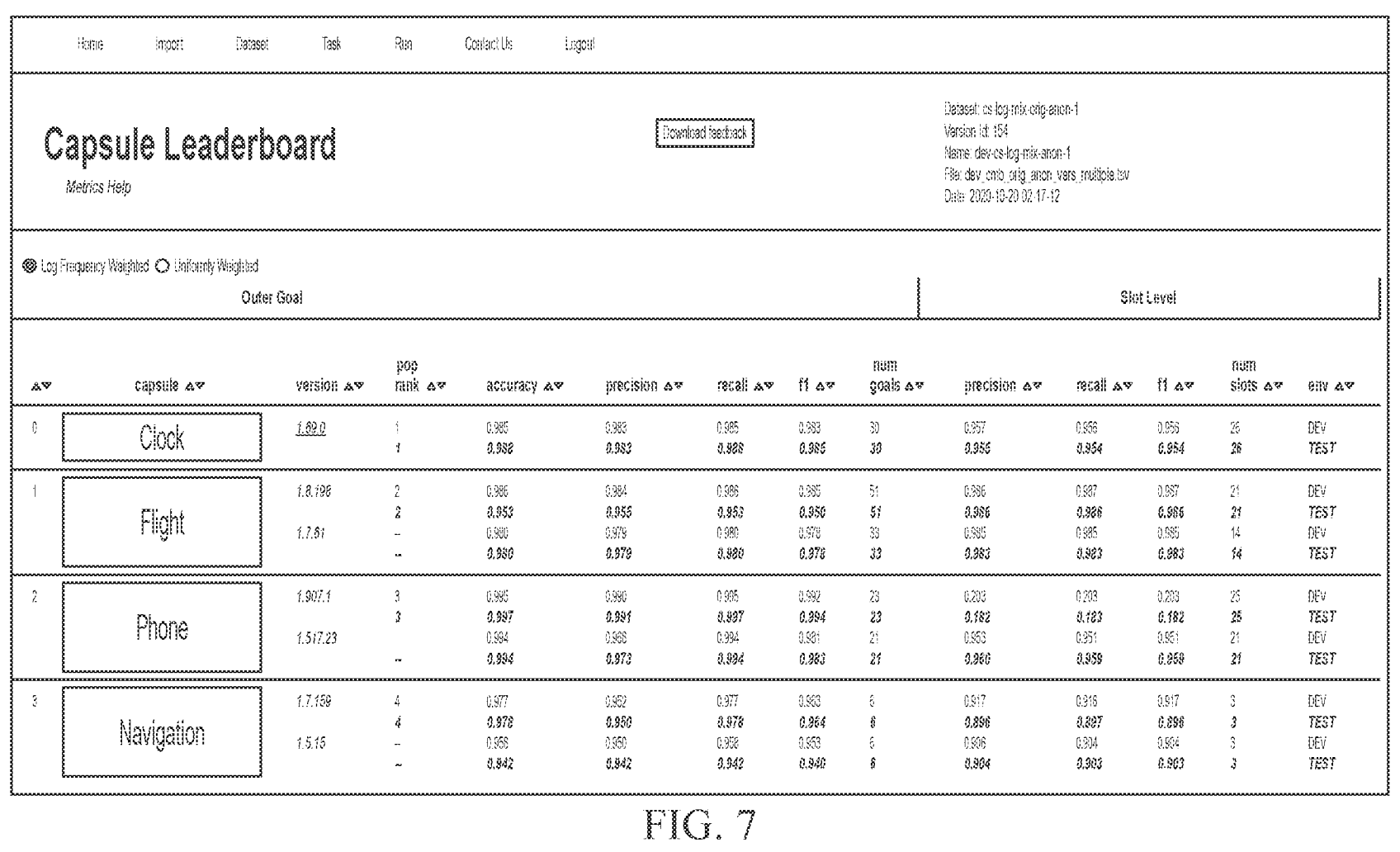

Home     Import     Dataset     Task     Run     Contact Us     Logout

Capsule Leaderboard
*Metrics Help*

● Log-Frequency Weighted  ○ Uniformly Weighted

| Outer Goal | | Download feedback | | Slot Level |

Dataset: us-log-mix-orig-anon-1
Version id: 154
Name: dev-us-log-mix-anon-1
File: dev_cmb_orig_anon_vers_inaudible.tsv
Date: 2020-10-20 02:47:12

| ▲▼ | capsule ▲▼ | version ▲▼ | pop rank ▲▼ | accuracy ▲▼ | precision ▲▼ | recall ▲▼ | f1 ▲▼ | num goals ▲▼ | precision ▲▼ | recall ▲▼ | f1 ▲▼ | num slots ▲▼ | env ▲▼ |
|---|---|---|---|---|---|---|---|---|---|---|---|---|---|
| 0 | Clock | 1.69.0 | 1 / 1 | 0.985 / 0.982 | 0.983 / 0.982 | 0.985 / 0.988 | 0.983 / 0.985 | 30 / 30 | 0.957 / 0.955 | 0.956 / 0.954 | 0.956 / 0.954 | 26 / 26 | DEV / TEST |
| 1 | Flight | 1.8.196 / 1.7.61 | 2 / 2 -- / -- | 0.986 / 0.953 / 0.980 / 0.959 | 0.984 / 0.935 / 0.979 / 0.979 | 0.986 / 0.953 / 0.980 / 0.980 | 0.985 / 0.959 / 0.979 / 0.973 | 51 / 51 / 33 / 33 | 0.986 / 0.986 / 0.985 / 0.983 | 0.987 / 0.986 / 0.985 / 0.983 | 0.987 / 0.986 / 0.985 / 0.983 | 21 / 21 / 14 / 14 | DEV / TEST / DEV / TEST |
| 2 | Phone | 1.907.1 / 1.517.23 | 3 / 3 -- / -- | 0.995 / 0.997 / 0.994 / 0.994 | 0.996 / 0.991 / 0.968 / 0.972 | 0.995 / 0.997 / 0.994 / 0.994 | 0.992 / 0.994 / 0.981 / 0.983 | 23 / 23 / 21 / 21 | 0.203 / 0.182 / 0.963 / 0.966 | 0.203 / 0.183 / 0.951 / 0.959 | 0.203 / 0.182 / 0.961 / 0.959 | 25 / 25 / 21 / 21 | DEV / TEST / DEV / TEST |
| 3 | Navigation | 1.7.139 / 1.5.15 | 4 / 4 -- / -- | 0.977 / 0.978 / 0.955 / 0.942 | 0.982 / 0.980 / 0.950 / 0.942 | 0.977 / 0.978 / 0.956 / 0.942 | 0.963 / 0.964 / 0.953 / 0.948 | 6 / 6 / 6 / 6 | 0.917 / 0.896 / 0.906 / 0.904 | 0.916 / 0.897 / 0.904 / 0.903 | 0.917 / 0.898 / 0.904 / 0.903 | 3 / 3 / 3 / 3 | DEV / TEST / DEV / TEST |

FIG. 7

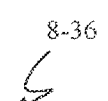
8-36
8-32
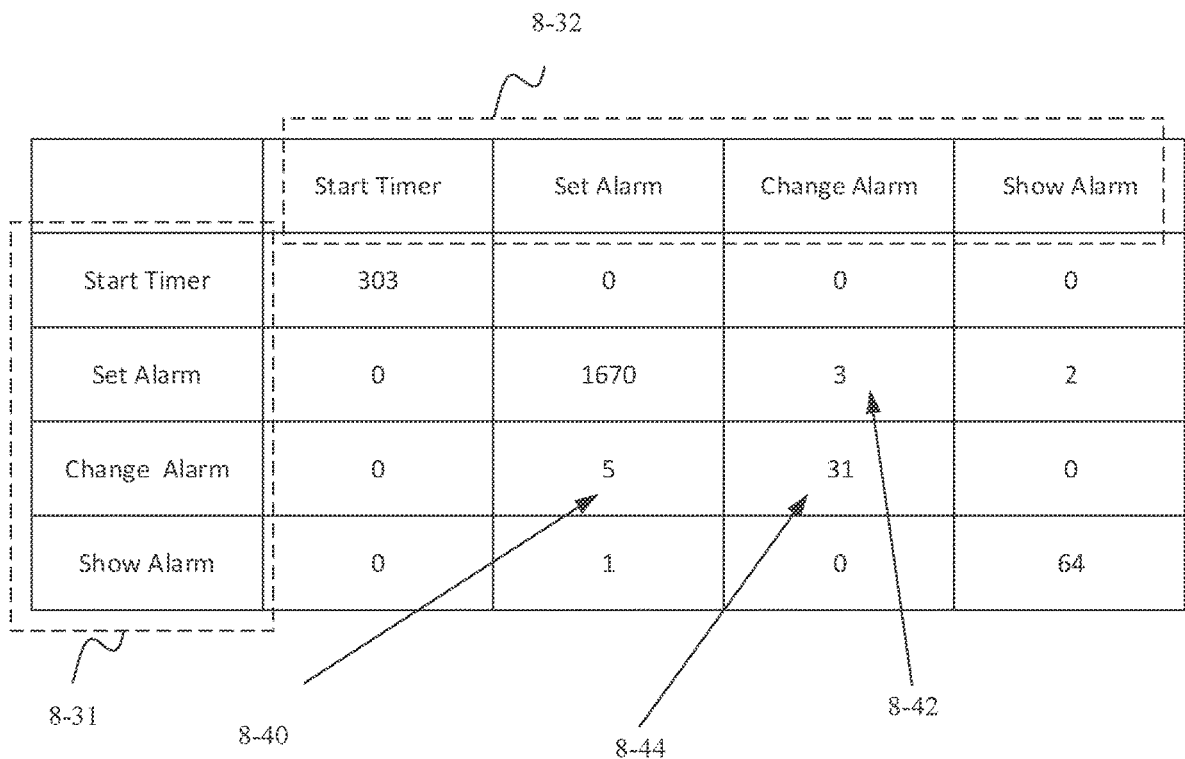
|  | Start Timer | Set Alarm | Change Alarm | Show Alarm |
|---|---|---|---|---|
| Start Timer | 303 | 0 | 0 | 0 |
| Set Alarm | 0 | 1670 | 3 | 2 |
| Change Alarm | 0 | 5 | 31 | 0 |
| Show Alarm | 0 | 1 | 0 | 64 |
8-31
8-40
8-44
8-42
FIG. 8

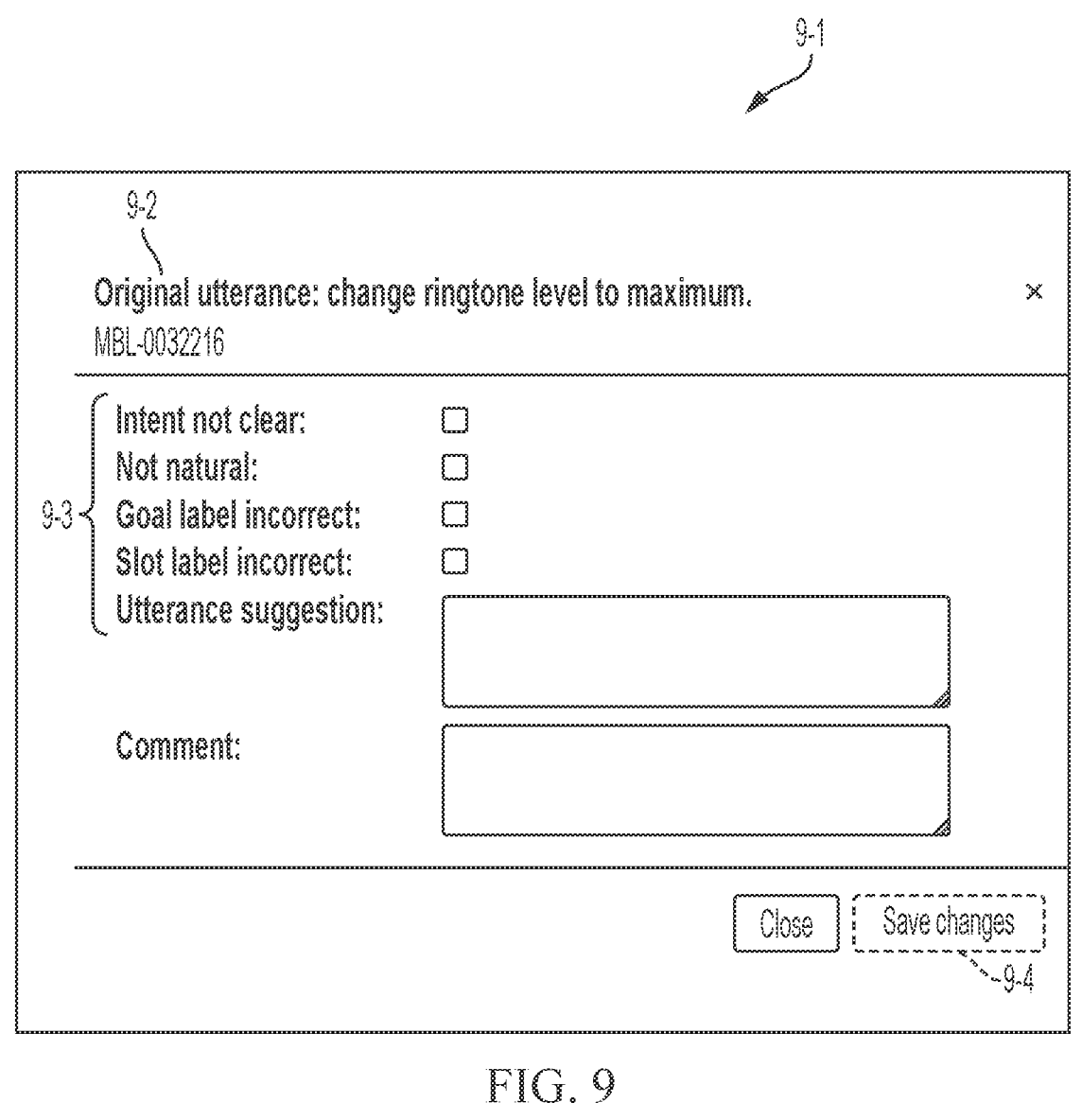

9-1

9-2

Original utterance: change ringtone level to maximum.    ×
MBL-0032216

9-3 {
Intent not clear:          ☐
Not natural:               ☐
Goal label incorrect:      ☐
Slot label incorrect:      ☐
Utterance suggestion:

Comment:

Close    Save changes
~9-4

FIG. 9

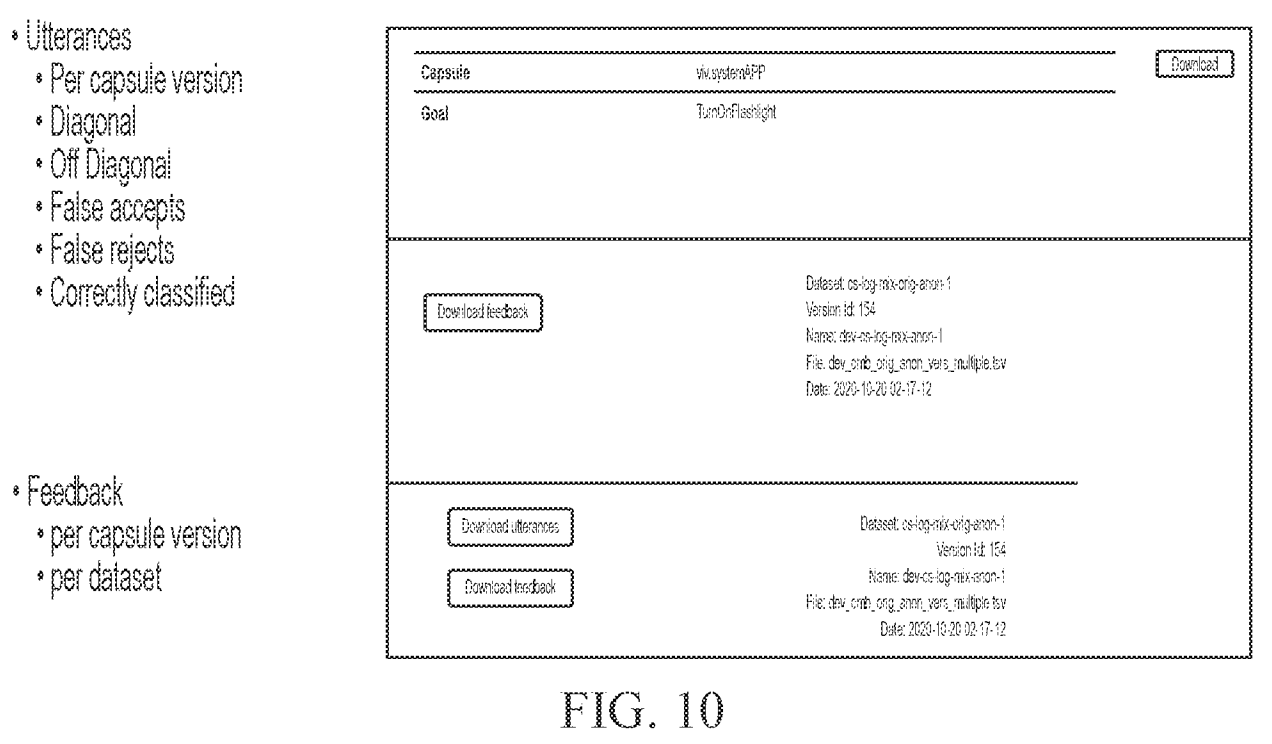

- Utterances
  - Per capsule version
    - Diagonal
    - Off Diagonal
    - False accepts
    - False rejects
    - Correctly classified

- Feedback
  - per capsule version
  - per dataset

| Capsule | viv.systems/PP |
| Goal | TurnOnFlashlight |

Download feedback

Dataset: os-log-mix-org-anon-1
Version id: 154
Name: dev-os-log-mix-anon-1
File: dev_cntx_orig_anon_vers_multiple.tsv
Date: 2026-10-26 02:17:12

Download utterances
Download feedback

Dataset: os-log-mix-org-anon-1
Version id: 154
Name: dev-os-log-mix-anon-1
File: dev_cntx_orig_anon_vers_multiple.tsv
Date: 2026-10-26 02:17:12

Download

FIG. 10

ELECTRONIC SYSTEM FOR DEVELOPING A MACHINE LEARNING MODEL

CROSS REFERENCE TO RELATED APPLICATION

This application claims benefit of priority of U.S. Provisional Application No. 63/256,889 filed on Oct. 18, 2021, the contents of which are hereby incorporated by reference.

FIELD

The present disclosure is related to tools for improving or developing a machine learning model.

BACKGROUND

The present application relates to machine learning models such as those for operating on input data to produce estimated classifications or predictions.

SUMMARY

Provided herein is a system for displaying a statistical performance of a machine learning model, the system including: a chart-plot-matrix presenter engine configured to display, on a visual debugger screen, a first entity including a chart or a feedback screen and a second entity including a scatter plot, a confusion matrix or an utterance set; an invocation engine configured to receive a first user input on the first entity or the second entity and invoke the chart-plot-matrix presenter engine to update the visual debugger screen in response to the first user input, wherein the first user input is responsive to the chart; and a parameter engine configured to receive a second input on the feedback screen wherein the second input is configured to cause improvement of one or more performance parameters determining the statistical performance of the machine learning model.

Also provided herein is a method for displaying a statistical performance of a machine learning model, the method including: displaying, on a visual debugger screen, a first entity including a chart or a feedback screen and a second entity including a scatter plot, a confusion matrix or an utterance set; receiving a first user input on the first entity or the second entity and invoke the chart-plot-matrix presenter engine to update the visual debugger screen in response to the first user input, wherein the first user input is responsive to the chart; and receiving a second input on the feedback screen wherein the second input is configured to cause improvement of one or more performance parameters determining the statistical performance of the machine learning model.

Also provided herein is a non-transitory computer readable medium storing instructions, the instructions configured to cause one or more processors of a computer to perform a method for displaying a statistical performance of a machine learning model, the method including: displaying, on a visual debugger screen, a first entity including a chart or a feedback screen and a second entity including a scatter plot, a confusion matrix or an utterance set; receiving a first user input on the first entity or the second entity and invoke the chart-plot-matrix presenter engine to update the visual debugger screen in response to the first user input, wherein the first user input is responsive to the chart; and receiving a second input on the feedback screen wherein the second input is configured to cause improvement of one or more performance parameters determining the statistical performance of the machine learning model.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

FIG. 1A illustrates logic for helping a development person build a machine learning model, according to some embodiments.

FIG. 1C illustrates additional logic for helping the development person build the machine learning model, according to some embodiments.

FIG. 3B illustrates a simplified confusion matrix for some of the points of the scatter graph of FIG. 3A, according to some embodiments.

FIG. 5 illustrates logic presented to the development person to help in analyzing the confusion matrix of FIG. 8, according to some embodiments.

FIG. 7 illustrates a leaderboard, which is visual presentation of statistical performance of capsules of the machine learning model, according to some embodiments.

FIG. 8 illustrates a simplified confusion matrix for the clock capsule from the leaderboard of FIG. 7, according to some embodiments.

FIG. 9 illustrates a interface screen provided to the development person to request a specific action to be taken to improve the machine learning model, according to some embodiments.

FIG. 10 illustrates further information provided to the development person to help identify weaknesses in the machine learning model, according to some embodiments.

DETAILED DESCRIPTION

Figure 1B:
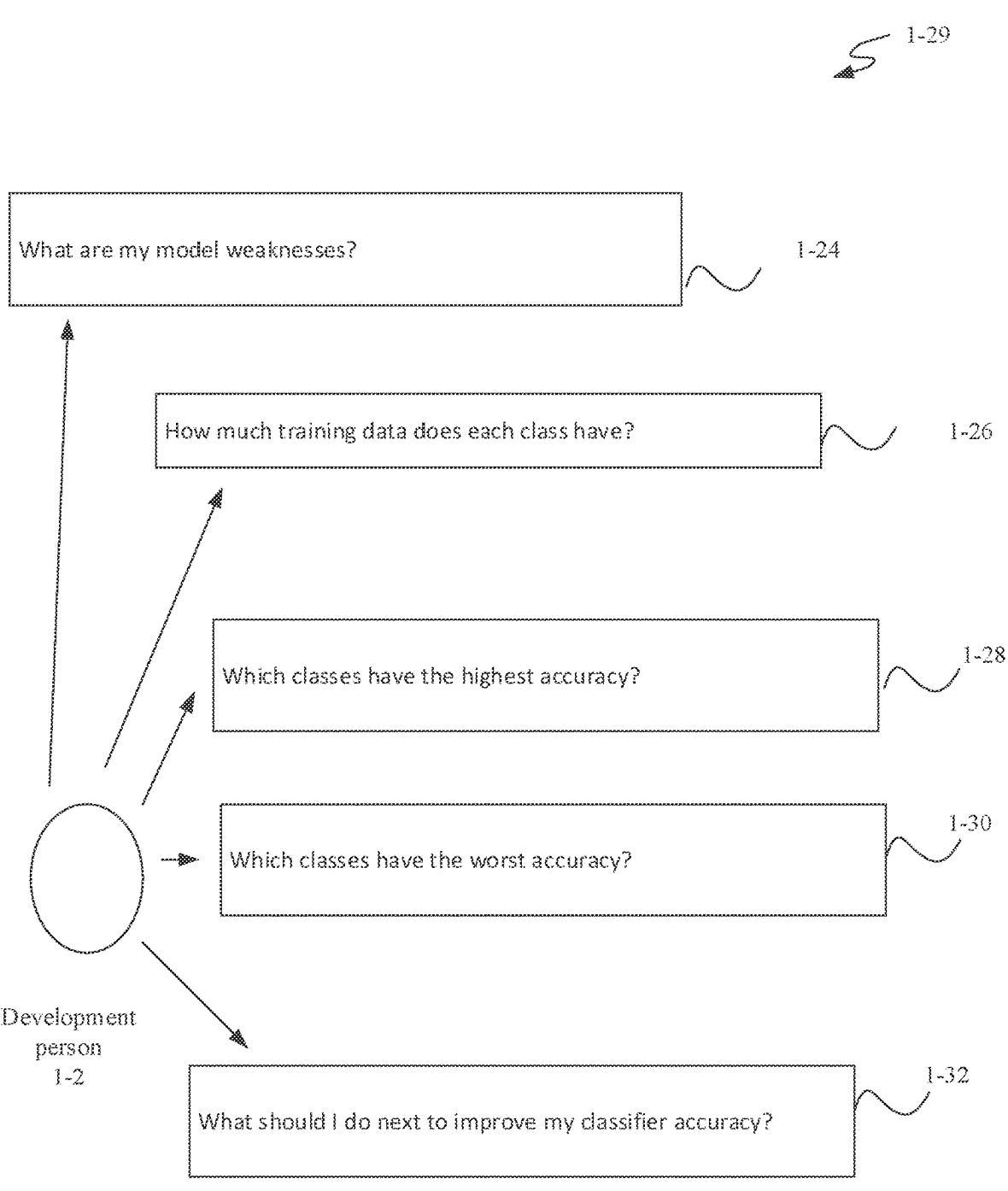
FIG. 1B illustrates performance questions the development person may have when building the machine learning model, according to some embodiments.

Disclosed herein is a system for providing a user with one or more tools in order to improve a performance of a machine learning model, such as statistical performance of the model. In some instances, the user is a development person.

In some examples, the system includes a chart-plot-matrix presenter engine configured to display, on the visual debugger screen, a first entity including a chart or a feedback screen and a second entity including a scatter plot, a confusion matrix or an utterance set. The system also includes, for example, an invocation engine configured to receive a first user input on the first entity or the second entity and invoke the chart-plot-matrix presenter engine to update the visual debugger screen in response to the first user input. Generally, the first user input is responsive to the chart. The system also includes a parameter engine configured to receive a second input on the feedback screen and to send the second input to a server or to save the second input to a memory wherein the second input is configured to cause improvement of a first parameter, a second parameter, a third parameter or a fourth parameter of the machine learning model. For example, the first parameter is a data set size of a data set, the second parameter is a label set associated with the data set, the third parameter is a label guideline document and the fourth parameter is a complexity of the machine learning model.

In an example, the chart is a flow chart including instructions for the user.

The scatter plot generally includes a plurality of circles or shapes. As an example, a first circle of the plurality of circles is associated with a first task of the machine learning model. The chart has an abscissa which corresponds to one performance measure such as recall and an ordinary corresponding to another performance measure, such as precision. In an example, the first circle is plotted at an abscissa value corresponding to a first recall performance of the first task, and the first circle is plotted at an ordinate value corresponding to a first precision performance of the first task. A diameter of the first circle, or the size of the shape more generally, corresponds to a first number of training instances in a first data set, wherein the machine learning model has been trained to perform the first task using the first data set.

In an example, the chart is a first chart associated with a plurality of tasks of the machine learning model.

Generally, the first chart instructs the user to increase the first number of training instances if the first recall performance is below a first threshold or the first precision performance is below a second threshold. In some examples, the second threshold is equal to the first threshold. The threshold may be, for example, 0.75. Alternatively, the threshold is 0.9, 0.95 or 0.99.

In an example, the first chart instructs the user to view the confusion matrix. The confusion matrix may be a first confusion matrix associated with the plurality of tasks of the machine learning model.

In some embodiments, the chart-plot-matrix presenter engine is configured to display a second chart and the first confusion matrix. The second chart instructs the user to make a selection of an off-diagonal entry of the first confusion matrix in order to view first detailed data including a first wrongly-classified task. The selection by the user may be based on a ranking such as the off-diagonal entry being a largest entry in the first confusion matrix not on a diagonal of the first confusion matrix. The selection may be based on the off-diagonal entry exceeding a threshold different than the first threshold.

The second chart may instruct the user to examine the utterance set.

In some examples, the second chart instructs the user, responsive to the first wrongly-classified task being associated with correct labels, to retrain the machine learning model after increasing the complexity of the machine learning model.

In some examples, the second chart instructs the user, responsive to the first wrongly-classified task being associated with incorrect labels, to retrain the machine learning model after obtaining a second training set.

FIG. 1A illustrates logic 1-5 for helping a development person 1-2 improve a machine learning model 1-3 which is in development. At operation 1-4, the development person 1-2 defines the classification or other ML problem that the ML model 1-3 will solve.

At 1-6, guidelines are defined for collecting labelled data.

At 1-8 metrics are defined for evaluating classifier performance of the ML model 1-3.

Logic 1-5 includes an iterative loop including the operations 1-10, 1-12, 1-14, 1-16.

At 1-10, labeled data is collected.

At 1-12 the ML model 1-3 is trained with model complexity 1-23, training data 1-21 and labels 1-22.

At 1-14, the ML model 1-3 is evaluated.

At 1-16 the results of the evaluation are checked.

If the results are not satisfactory, a decision is made at 1-18 to get additional training data 1-21 and/or labels 1-22. The logic flows via path 1-19 to 1-12.

If the results are satisfactory, the ML model becomes ML model 1-5 which is a mature model, and is used in an application as indicated by item 1-15.

FIG. 1B illustrates performance questions 1-29 a user of a ML model, such as a development person 1-2, may have when building the ML model 1-3. The development person 1-2 may not be skilled in terms of machine learning technology. The development person 1-2 may not have time to write debugging scripts such as scripts in the Python language, to find out whether the ML model 1-3 is performing well, and if not performing well, to find the underlying data which will lead to finding out of the training data, labelling or model complexity are a root cause of the poor classifier performance of the ML model 1-3. Requiring a person to understand the mechanics and details of a ML model or to be able to write and understand debugging scripts in order to understand and improve the performance of a ML model makes using and improving a ML model very user unfriendly. These complex approaches to improving a ML model hinders the development and successful deployment of a ML model and hinders a user's ability to improve a ML model, which decreases the beneficial results the ML model can provide. Among other things, the system and methods described herein provide an intuitive, user-friendly interface with easy-to-understand elements that enable the user to comprehend how well the ML model is working, to investigate ways to improve the model, and to quickly and easily improve the functioning of the ML model.

The development person 1-2 may have specific questions for problem solving poor performance of the ML model 1-3. Example questions 1-24, 1-6, 1-28, 1-30 and 1-32 are as follows. The development person 1-2 may wish to identify weaknesses of the ML model 1-3, determine how much training data has been used for each class of the ML model 1-3, determine which classes have high accuracy, and determine which classes have the worst accuracy. After this analysis of the ML model 1-3, the development person may want to know what they should do next to improve classifier accuracy of the ML model 1-3. While this disclosure describes examples of a developer person as interacting with the systems and methods described herein to improve the ML model, this disclosure contemplates that the systems and methods disclosed herein may be used by any individual to improve a ML model used by that person.

FIG. 1C illustrates additional logic 1-32 for helping the development person 1-2 build or improve the ML model 1-3. The description below also refers to the example graph of FIG. 6A. The graph may also be referred to as a trellis or a tree.

At 1-34, visual tool 1-1 provides a screen 6-16 including a scatter plot to the development person 1-2.

At 1-36, the visual tool 1-1 receives user inputs 1-71 and 1-72 for advancing to another level in the graph of FIG. 6A, thus causing an update of the visual debugger screen at 1-38 as mentioned below.

At 1-38, a second visual debugger screen, for example, screen 6-26 including a confusion matrix, is provided to the development person 1-2

At 1-40, parameters of a model builder 1-81 are updated based on user inputs related to the screen 6-26.

At 1-42, the ML model 1-3 is retrained. When performance is satisfactory, the ML model 1-3 is output as ML model 1-5 (mature).

At 1-44, a speech utterance is received and processed by the ML model 1-5. The ML model 1-5 classifies the speech utterance and provides a classification result. The classification result may be a list of candidate classifications and a probability for each candidate classification.

Figure 1D:
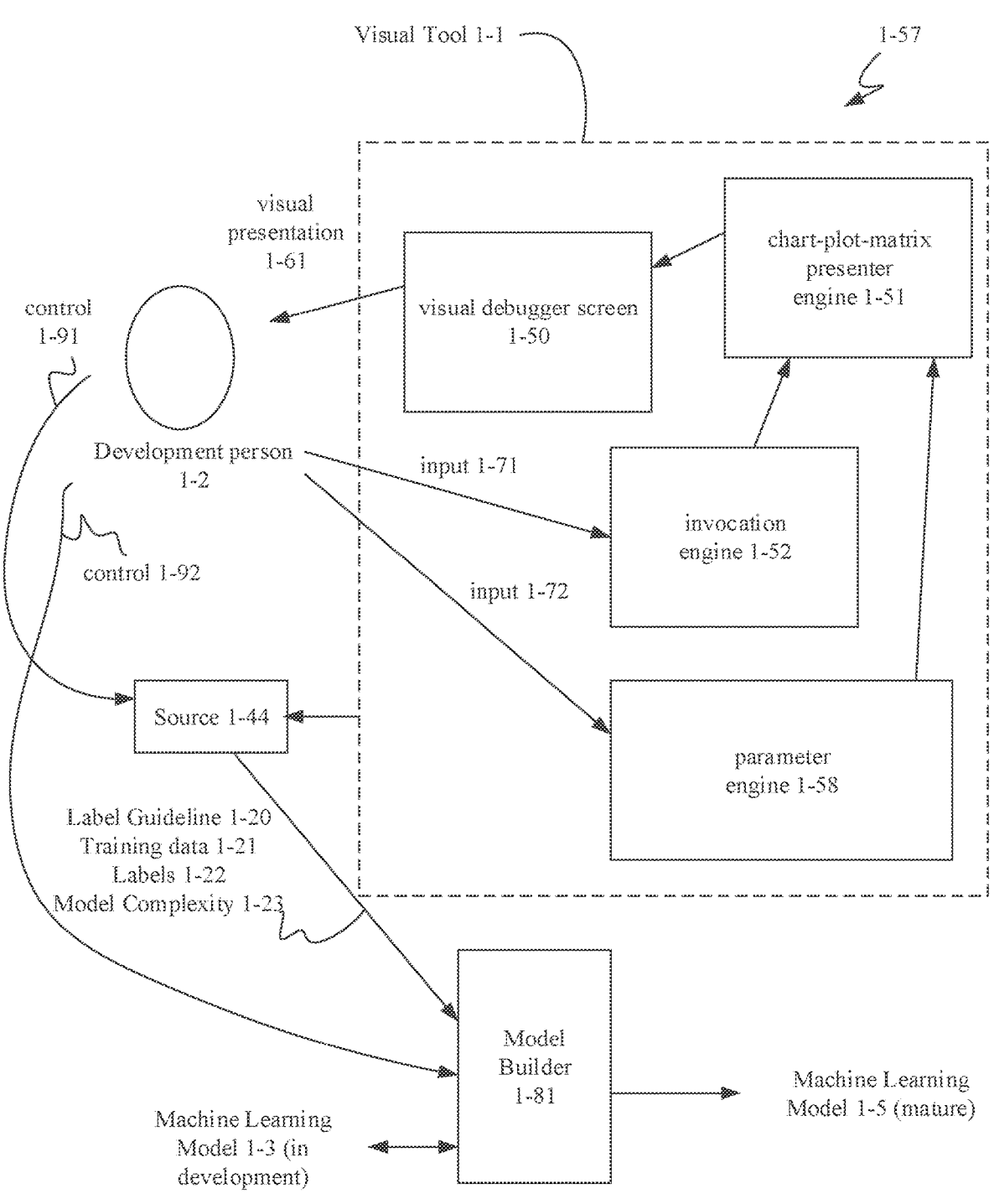
FIG. 1D illustrates the development person using a visual tool to develop the machine learning model, according to some embodiments.

FIG. 1D illustrates the development person 1-2 using the visual tool 1-1 in a system 1-57 to improve the ML model 1-3 and finally produce the ML model 1-5, which is a mature and finished version of the ML model 1-3.

The visual tool 1-1 includes a visual debugger screen 1-50, a chart-plot-matrix presenter engine 1-51, an invocation engine 1-52 and a parameter engine 1-58. Each engine may implemented by the apparatus of FIG. 12.

The development person is presented with a visual presentation 1-61 corresponding to the visual debugger screen 1-50. The development person considers the visual presentation 1-61 and responds with input 1-71 or input 1-72, control 1-91 or control 1-92. These inputs cause an update of the visual debugger screen. For example, input 1-71 chooses further data in the graph represented by FIG. 6A. Input 1-72 determines that more training data 1-21 is needed, an improved labelled set 1-22 is needed, a better label guideline 1-20 is needed or an increased model complexity 1-23 is needed. A label guideline is a text or visual document used by people who look at actual utterances and assign labels to them.

Input 1-72 may use interface screen 9-1 of FIG. 9. Interface screen 9-1, in some embodiments, also represents control 1-91 which causes source 1-44 to provide more training data 1-21, better labels 1-22 or update the label guideline 1-20. Thus interface screen 9-1 provides feedback and may be referred to as a feedback screen. Control 1-92 causes model builder 1-81 to retrain the ML model 1-3 after more training data 1-21, better labels 1-22 have been provided by the source 1-44. While interface 9-1 of FIG. 9 is one example of a feedback screen that may be presented to a user, this disclosure contemplates that in general the feedback screen providing feedback may not have the particular features of interface screen 9-1 described herein.

The source 1-44 may be a company or group of engineers who provided training data for ML model building.

The model builder returns the re-trained model for further analysis (see FIG. 1A). When the model is mature, it is output as ML model 1-5.

Figure 1E:
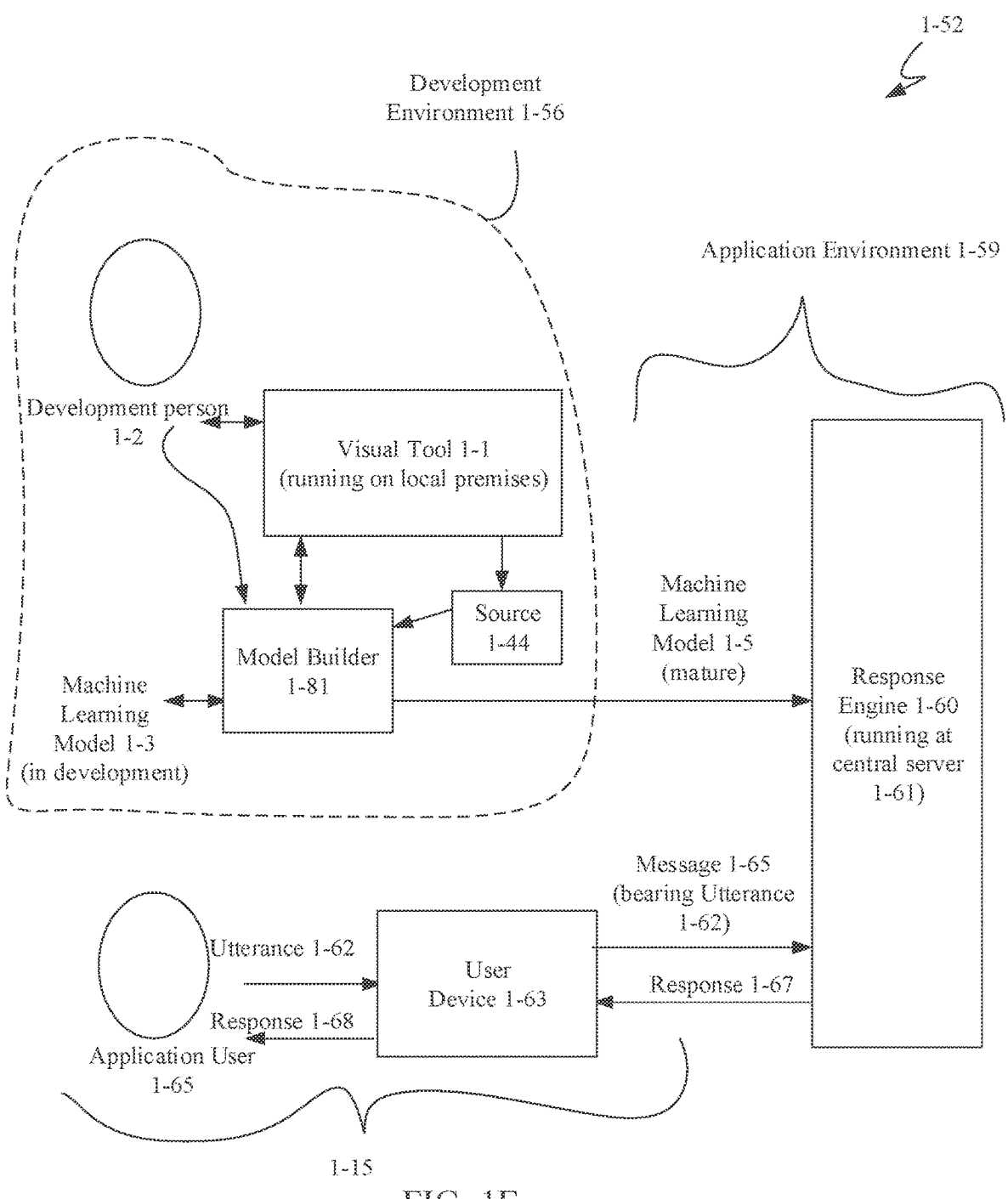
FIG. 1E illustrates the development person using the visual tool to develop the machine learning model, and an application user using the machine learning model, according to some embodiments.

FIG. 1E illustrates a system 1-52 including development environment 1-56 and application environment 1-59. In an example, the development person 1-2 uses the visual tool 1-1 in the development environment 1-56 to develop the ML model 1-5 and provide the ML model 1-5 to a response engine 160. An application user 1-65 provides a question or command as an utterance 1-62 to a user device 1-63 which may be a subscriber device such as a smart phone or another user device such as a tablet or another device such as an Internet of Things (IoT) device. A message 1-65 is sent to the Response engine 1-60 which process the utterance 1-62 using the ML model 1-5 to obtain response 1-67. The response engine 1-60 sends back the response 1-67 to the user device 1-63. The user device 1-63 provides the response 1-68, which may include information on a display screen provided to the application user 1-65, an audible answer or may be execution of a command such as opening an application ("app"), configuring an app, controlling something in the physical environment of application user 1-65 such as turning on room lights or turning off room lights, etc.

Figure 2:
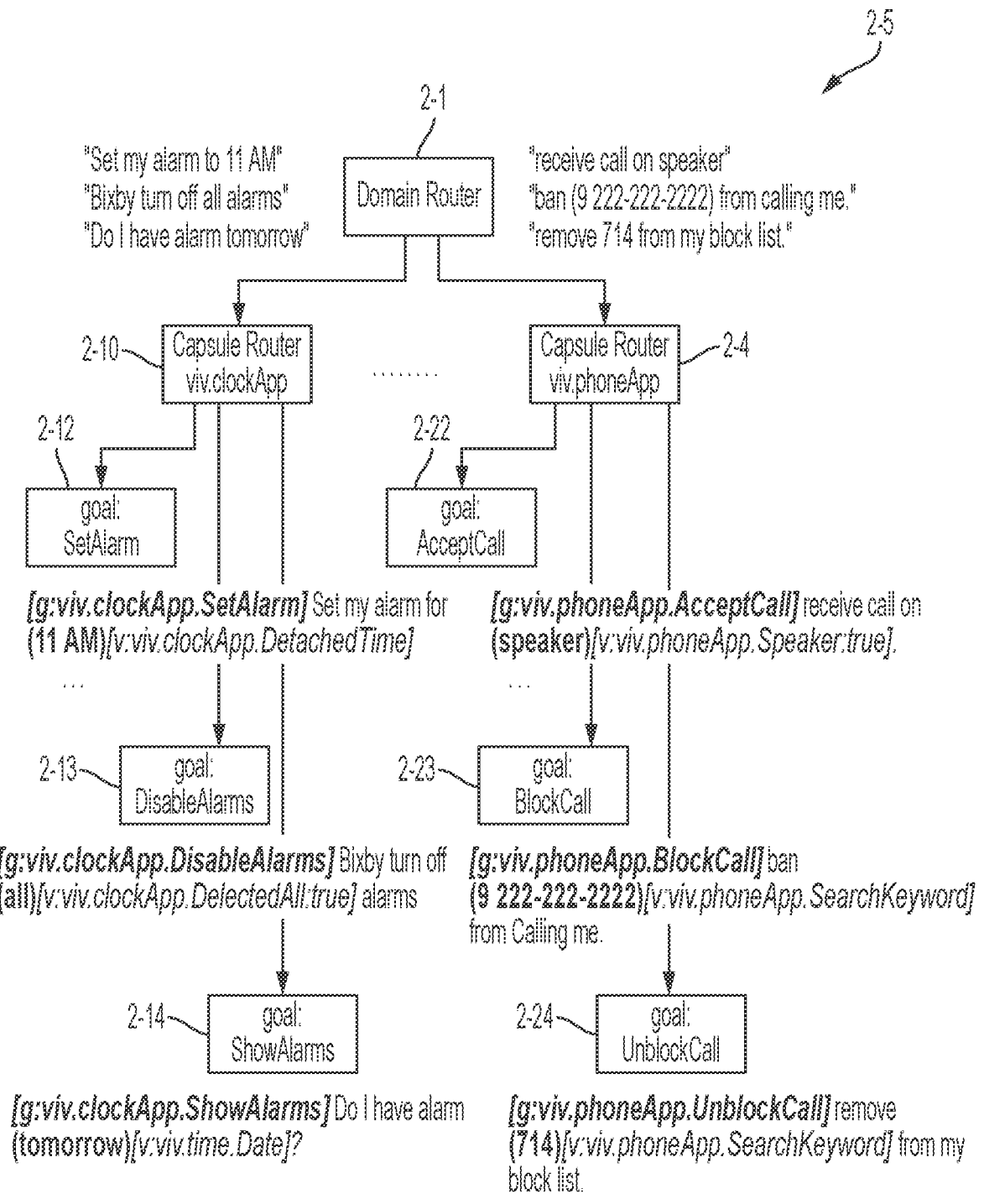
FIG. 2 illustrates a portion of the machine learning model architecture, according to some embodiments.

FIG. 2 illustrates a portion of the machine learning model architecture 2-5 of ML model 1-3 and ML model 1-5.

The ML model architecture 2-5 includes a domain router 2-1 and several capsule routers, here indicated as 2-10 and 2-4.

The domain router 2-1 receives utterances such as 1-62 and causes execution of an appropriate capsule router. Examples of the utterance 1-62 are "set my alarm to 11 AM," "Bixby turn off all alarms," "Do have alarm tomorrow," "receive call on speaker," "ban (9 222-222-2222) from calling me," and "remove 714 from my block list."

Domain router 2-1 decides which capsule should process the utterance 1-62. The utterance examples pertaining to an alarm are forwarded to capsule router 2-10. Actions taken at a capsule level are referred to as goals. The capsule router 2-10 forwards to a goal possibly along with a parameter parsed from the utterance such as SetAlarm 2-12 (parameter: 11 AM), DisableAlarms 2-13 and ShowAlarms 2-14.

The utterance examples pertaining to use of a phone are forwarded to capsule router 2-4. The capsule router 2-4 forwards to a goal possibly along with a parameter parsed from the utterance such as AcceptCall 2-22 (parameter: speaker), BlockCall 2-23 and UnblockCall 2-24.

Figure 3A:
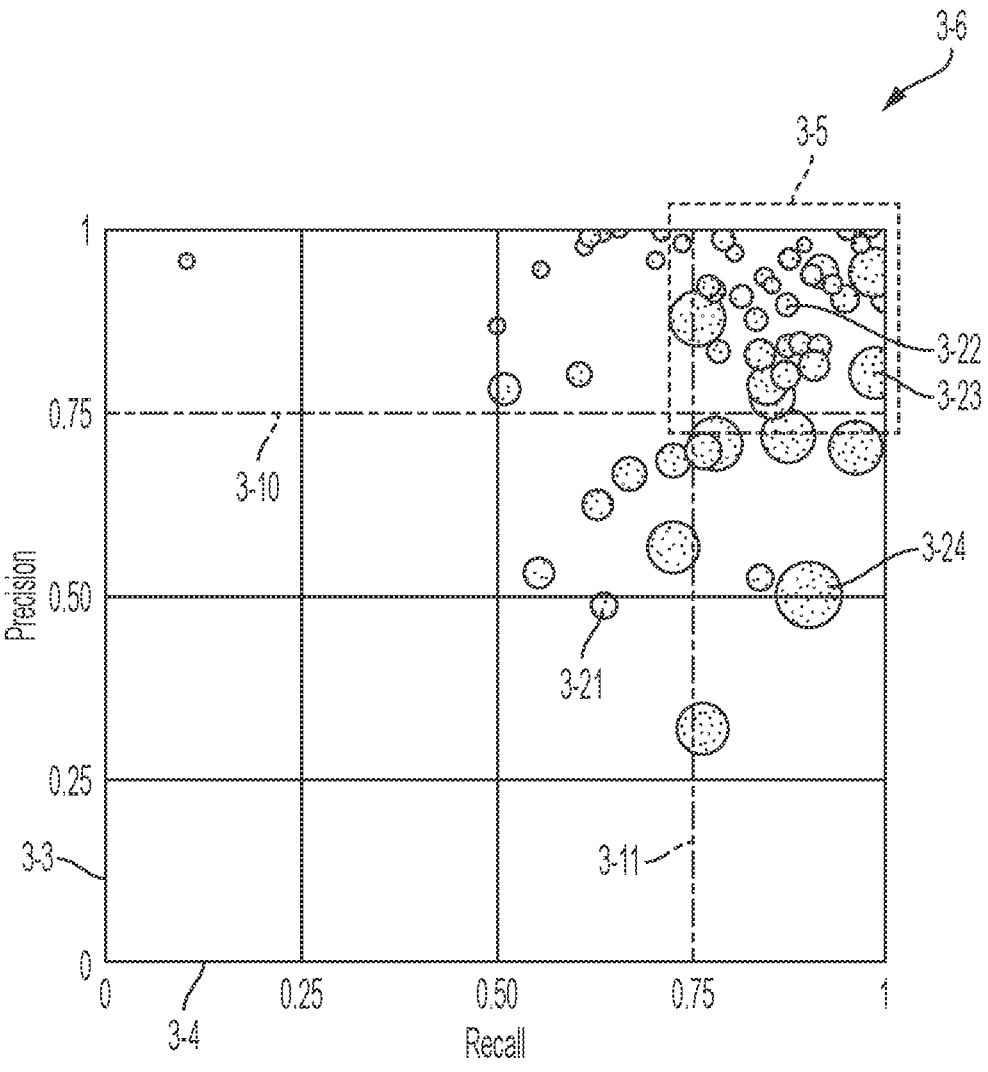
FIG. 3A illustrates a scatter graph of performance of a router of the machine learning model, according to some embodiments.

FIG. 3A illustrates a scatter graph 3-6 of performance of the domain router 2-1 of the ML model 1-3. The x-axis (abscissa 3-4) is a recall statistic and the y-axis (ordinate 3-3) is a precision statistic. A threshold performance for precision is indicated by the line 3-10. A threshold performance for recall is indicated by the line 3-11. A region in which precision and recall are above the threshold values is indicated generally as 3-5. The dashed line 3-5 is somewhat enlarged for ease of visual presentation so that 3-10 and 3-11 remain visible.

The scatter graph 3-6 includes a circle for each capsule within the architecture 2-5. A diameter of a circle indicates a proportional amount of training data 1-21 used to train that capsule. Circles 3-23 and 3-24 have larger diameters than circles 3-22 and 3-21, for example.

Circles 3-22 and 3-23 are within the acceptable region 3-5.

Circles 3-21 and 3-24 are not in the acceptable region 3-5.

Scatter graph 3-6 provides answers to some of the questions 1-29 asked by development person 1-2 (see FIG. 1B).

A router confusion matrix 3-36 as shown in FIG. 3B is also provided by the visual tool 1-1 to the development person 1-2 in order to analyze the performance of the ML model 1-3 overall. FIG. 3B is a simplified version of an actual router confusion matrix. The number of rows in an actual router confusion matrix may be on the order of 50-100, one row for each capsule provided within the ML model 1-3.

A second example of the router confusion matrix is provided in Table 1.

TABLE 1

|  | Home | QAEN | launcher | Chat |
|---|---|---|---|---|
| Home | 210 | 1 |  | 2 |
| QAEN |  | 1334 |  | 14 |
| launcher |  | 2 | 789 |  |
| Chat |  | 10 |  | 268 |

The router confusion matrix allows the development person 1-2 to evaluate the ML model 1-3 in detail. The development person 1-2 has direct access by clicking on hyper links embedded in the router confusion matrix. Thus the confusion matrix may also be referred to as an active confusion matrix. Using the confusion matrix of FIG. 3B, a comparison between capsules (generally called classes) is made simple.

Example goals of navigation, clock, flight and phone are shown in the column marked as item 3-31. The same goals appear as column labels in item 3-32.

The router confusion matrix indicates that of all the utterances in training data 1-21 related to clock, 789 (item 3-40) were recognized as pertaining to the clock capsule. Of all the utterances in training data 1-21 related to clock, 100 were misrecognized as pertaining to the phone capsule (item 3-42).

The router confusion matrix indicates that of all the utterances in training data 1-21 related to phone, 142 (item 3-43) were recognized as pertaining to the phone capsule. Of all the utterances in training data 1-21 related to phone, 13 were misrecognized as pertaining to the clock capsule (item 3-41).

Figure 4:
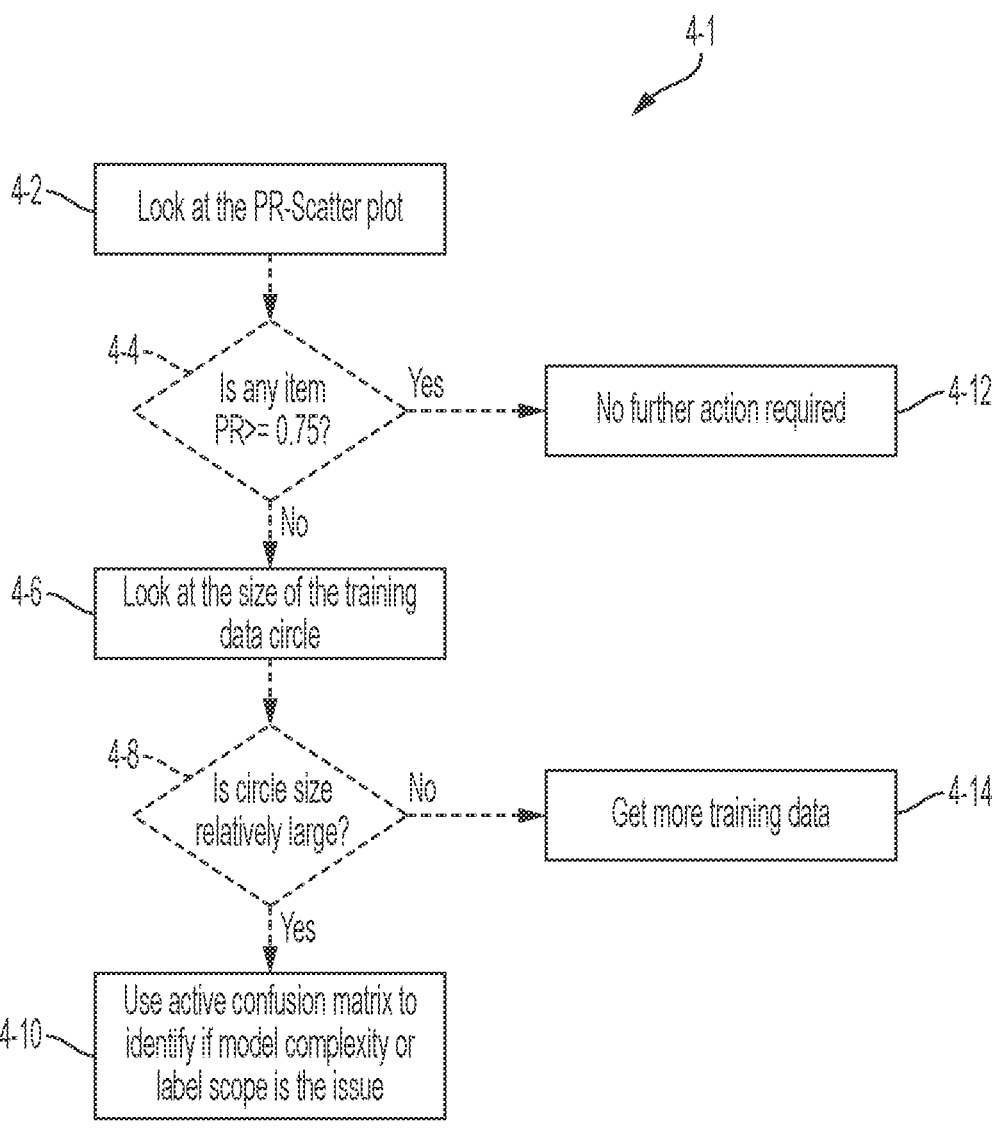
FIG. 4 illustrates logic presented to the development person to help in analyzing the scatter graph of FIG. 3A, according to some embodiments.

Turning to FIG. 4, the visual tool 1-1, at operation 4-2 and using visual presentation 1-61, directs the development person 1-2 to look at the scatter graph 3-6. Decision diamond 4-4 directs the development person 1-2 to consider items within the region 3-5 as performing well and no further actions needed (operation 4-12). For those circles not in region 3-5, logic 4-1 at operation 4-6 directs the development person to consider the size of the circle.

Decision diamond 4-8 seeks a path to improve a poorly-performing capsule by asking at operation 4-8 whether the circle size is relatively large. If the circle is not large, visual tool 1-1, using logic 4-1, directs the development person 1-2 get more training data 1-21. The development person may provide input 1-72 to the interface screen 9-1 in order to obtain more training data from the source 1-44.

Returning to decision diamond 4-8, if the circle is relatively large, training data 1-21 for this capsule appears sufficient. In that case, logic 4-1 directs the development person 1-2 via the visual presentation 1-61 to select a confusion matrix for this capsule in order to determine if model complexity or label scope is the issue causing poor performance.

Returning to FIG. 3A, the development person may determine that the capsule corresponding to circle 3-21 has too little training data, and request more training data via the interface screen 9-1.

The development person 1-2 may determine that the capsule corresponding to circle 3-24 has enough training data, and provide input 1-71 asking that the confusion matrix for this capsule be presented visually in the visual presentation 1-61. The input 1-71 thus causes an update of the visual debugger screen by providing the requested capsule confusion matrix.

FIG. 5 illustrates logic 5-1 presented to the development person 1-2 in visual presentation 1-61 to help in analyzing a router confusion matrix or a capsule confusion matrix. A router confusion matrix 3-36 is shown in FIG. 3B. A capsule confusion matrix 8-36 is shown in FIG. 8.

At operation 5-2, the development person 1-2 who has found, from scatter plot 3-6, that a capsule is not performing well, is directed to look at the router confusion matrix 3-36 of FIG. 3B. The router confusion matrix shows misclassified capsules. In some embodiments, the router confusion matrix 3-36 is an active confusion matrix with each cell associated with a hyper link to further data. By clicking on a cell, the development person 1-2 can examine the utterances which were not classified correctly for a particular capsule.

At operation 5-4, the development person 1-2 is directed to identify the row (capsule) which has a poor performance.

At operation 5-6, the development person 1-2 is directed to identify the column of the selected capsule (row), which has the highest classification errors.

At operation 5-8 the development person 1-2 is directed to click on the cell (row, column) to look at the misclassified utterances.

At decision diamond 5-10, if the labels are correct, the development person 1-2 is directed at operation 5-14 to retrain the ML model 1-3 with increased complexity. Increased complexity may correspond to increasing the number of layers in a neural network or adding more trees in a random forest.

At decision diamond 5-10, if the labels are not correct, the development person 1-2 is directed at operation 5-12 to improve the labels 1-22 or improve the label guideline 1-20 and retrain the ML model 1-3.

Referring to FIG. 8, goals 8-31 include Start Timer, Set Alarm, Change Alarm and Show Alarm. Similarly to the confusion matrix 3-36 of FIG. 3B, these goals also appear as column headings as item 8-32. There is some confusion in the ML model 1-3 between the goals of Set Alarm and Change Alarm. Utterances corresponding to Change Alarm have been identified 5 times as pertaining to Set Alarm (see item 8-40). Utterances corresponding to Set Alarm have been identified 3 times as pertaining to Change Alarm (see item 8-42). Utterances corresponding to Change Alarm have been identified 31 times as pertaining to Change Alarm (see item 8-44).

The logic of FIG. 5 also applies to the capsule confusion matrix of FIG. 8.

For example, at operation 5-8, applying the logic 5-1 to the capsule confusion matrix 8-36, the development person may examine the five utterances 8-40 that should have been classified as Change Alarm and were instead classified as Set Alarm. If the labels are correct, the portion of the ML model 1-3 associated with the Clock capsule will be increased. If the labels are not correct the quality of labels associated with the training data 1-21 for the Clock capsule will be increase (re-labelled to get it right) or the labelling guideline 1-20 will be improved (better guidance for the people providing source 1-44).

Figure 6A:
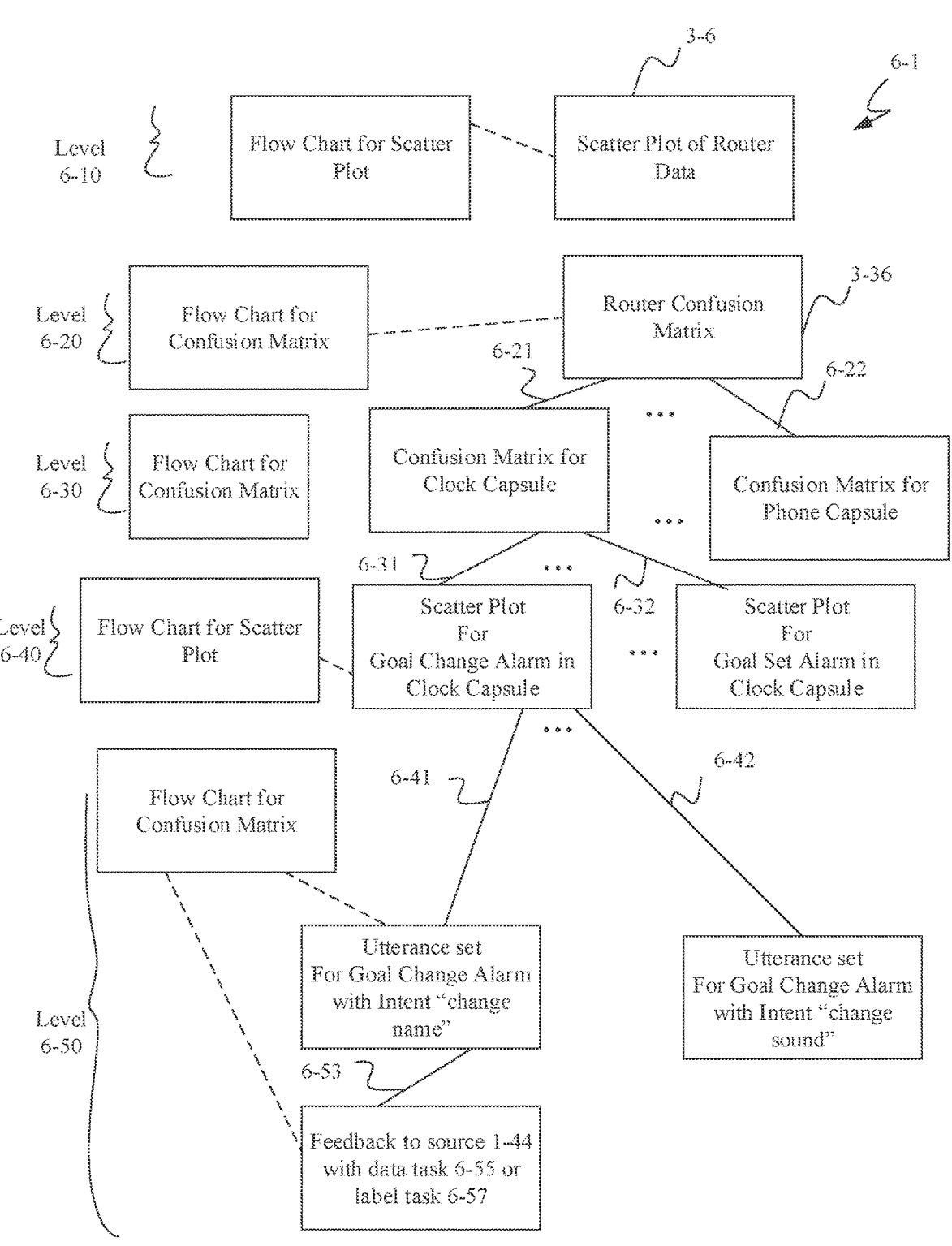
FIG. 6A illustrates a graph of visual information provided to the development person to help in developing the machine learning model, according to some embodiments.

FIG. 6A illustrates a graph 6-1 of visual presentation 1-61 provided to the development person 1-2 to help in developing the ML model 1-3. A time flow proceeds from top to bottom in FIG. 6A as the development person 1-2 is helped to analyze the ML model 1-3 and to find problems that need to be corrected. FIG. 6A may also be referred to as a trellis or a tree.

Starting at the top of FIG. 6A, note that the flow chart 4-1 is part of the visual presentation 1-61. Further to action 4-2, the development person 1-2 looks at the scatter plot for router data, similar to FIG. 3A. This activity is represented as a Level 6-10 in FIG. 6A. In some situations, the development person uses user interface at Level 6-10 to request more training data 1-21 based on the scatter plot 3-6.

In case there is a capsule not in the region 3-5 but with sufficient training data, the development person 1-2 looks at the router confusion matrix as indicated by 4-10. This activity is represented as Level 6-20 in FIG. 6A.

In an example, the development person 1-2 notes that some utterances related to the clock capsule are misclassified and routed to the phone capsule (see item 3-42 of FIG. 3B).

The development person 1-2 is provided with logic 5-1 as part of the visual presentation 1-61 at Level 6-20. Based on identifying the off-diagonal cell at 5-6 of logic 5-1, the development person 1-2 selects the cell 3-42 (see FIG. 3B). The development person 1-2 then has the option of looking at the 100 utterances that were misclassified as the phone capsule. Note that at the router level, the utterances contributing to the off-diagonal cell are generally the most useful.

In an example, the development person 1-2 looks at utterances. See Tables 2, 6 and 7 for example utterances.

TABLE 2

| Row | Id | Utterance | Label | Hypothesis | Problem |
|---|---|---|---|---|---|
| 0 | LOG-0002101 | what is the right tip amount for €18? | Gratuity | StockInfo | Label correct. If sample size small, increase training samples. Else increase model complexity. |
| 1 | LOG-0007627 | i'd like you to display the tip on a check of ¥75. | Gratuity | StockInfo | Same as above |
| 2 | LOG-0009312 | tell me the total tip on 74 krone. | Gratuity | StockInfo | Same as above |

Also when evaluating utterances, the visual tool 1-1 provides false accept distribution and false reject distribution as shown in Tables 3 and 4.

TABLE 3

| False Accepts | | |
|---|---|---|
| Correctly Classified (92) | | |
| | Correct | Total | Precision |
| bestKnownGateDeparture | 92 | 99 | 92.93 |

| False Accepts (7) | | |
|---|---|---|
| Capsule Name | Count | Percentage |
| bestKnownGateArrival | 4 | 57.14 |
| FlightStatus#duration | 2 | 28.57 |
| FlightStatus | 1 | 14.29 |

TABLE 4

| False Rejects | | |
|---|---|---|
| Correctly Classified (92) | | |
| | Correct | Total | Recall |
| bestKnownGateDeparture | 92 | 127 | 72.44 |

| False Rejects (35) | | |
|---|---|---|
| Capsule Name | Count | Percentage |
| bestKnownGateArrival | 19 | 54.29 |
| FlightStatus#timeRemaining | 7 | 20.00 |
| FlightStatus | 5 | 14.29 |
| FlightStatus#duration | 3 | 8.57 |
| FlightStatus#scheduledGateDeparture | 1 | 2.86 |

Table 5 is another example of a within-capsule intent confusion matrix.

| | Enable-Alarms | Edit-Alarm | Disable-Alarms | Show-Alarms |
|---|---|---|---|---|
| EnableAlarms | 102 | | | 11 |
| EditAlarm | | 19 | | 1 |
| DisableAlarms | | | 194 | 5 |
| ShowAlarms | | | | 64 |

Table 6 provides within-capsule goal error examples.

| Row | Id | Utterances | GT | Hyp | Precision | Recall |
|---|---|---|---|---|---|---|
| 0 | 13289 | I would like to know what time RJ 73 is arriving | [Gate Arrival] I would like to know what time | [Gate Departure] I would like to know what time | 1 | 1 |

-continued

| Row | Id | Utterances | GT | Hyp | Precision | Recall |
|---|---|---|---|---|---|---|
| 1 | 13438 | What time will BG 1788 be landing | [Gate Arrival] What time will | [Gate Departure] What time will | 1 | 1 |
| 2 | 13512 | Tell me what time Southwest flight 4 is landing tomorrow | [Gate Arrival] Tell me what time | [Gate Departure] Tell me what time | 1 | 1 |
| 3 | 13523 | When is Korean Air 352 landing | [Gate Arrival] When is | [Gate Departure] When is | 1 | 1 |

Table 7 provides within-capsule slot precision/recall analysis.

TABLE 7

| Row | Id | Utterance | Aligned NL (GT) | Aligned NL (Hyp) | Precision | Recall | Problem |
|---|---|---|---|---|---|---|---|
| 0 | 1234 | I want a new motown favorites song list | [CreatePlaylistNoActionResult] | [PlayClientAction] | 0 | 0 | |
| 1 | 5678 | Curate new playlist | [CreatePlaylistNoActionResult] | [PlayClientAction] | 0 | 0 | |
| 2 | 1278 | Add a driving tunes playlist | [CreatePlaylistNoActionResult] | [PlayClientAction] | 0 | 0 | |
| 3 | 5612 | Start new playlist study music | [CreatePlaylistNoActionResult] | [PlayClientAction] | 0 | 0 | |
| 4 | 1527 | Make a driving playlist for me | [CreatePlaylistNoActionResult] | [PlayClientAction] | 0 | 0 | |
| 5 | 5162 | Build new dance playlist | [CreatePlaylistNoActionResult] | [PlayClientAction] | 0 | 0 | |

Table 8 provides library capsule metrics.

TABLE 8

| | capsule | Version | Pop rank | Precision | Recall | F1 |
|---|---|---|---|---|---|---|
| 0 | Contact | 0.0.0.1 | 1 | .757 | .322 | .452 |
| 1 | Time | 0.0.0.1 | 2 | .783 | .677 | .726 |
| 2 | Geo | 0.0.0.1 | 3 | .750 | .796 | .773 |
| 3 | openHours | 0.0.0.1 | 4 | .957 | .898 | .927 |
| 4 | Money | 0.0.0.1 | 5 | .978 | .832 | .899 |
| 5 | Entity | 0.0.0.1 | 6 | 1.0 | 1.0 | 1.0 |
| 6 | Location | 0.0.0.1 | 7 | .795 | .663 | .723 |
| 7 | Measurement | 0.0.0.1 | 8 | 1.0 | .600 | .750 |
| 8 | Self | 0.0.0.1 | 9 | .778 | .500 | .609 |
| 9 | shareVia | 0.0.0.1 | 10 | .884 | .613 | .724 |

Returning to FIG. 6A at Level 6-30, in an example, the development person 1-2 has choices of many confusion matrices to look at, see paths 6-21 . . . 6-22 indicated on FIG. 6A. In an example, the development person 1-2 looks at the confusion matrix for the clock capsule, see FIG. 8 (see the path 6-21 on FIG. 6A).

From the confusion matrix for the clock capsule, the development person 1-2 decides to look a scatter plot for the goal "Change Alarm" (see the path 6-31 on FIG. 6A).

At Level 6-40, the development person 1-2 is then presented with the scatter plot for the goal "Change Alarm." The development person 1-2 then has options indicated on FIG. 6A as 6-41, . . . , 6-42.

In an example, the development person 1-2 chooses to examine the utterance set for the goal Change Alarm with Intent "change name." Finally, the development person 1-2 provides feedback to source 1-44 with data task 6-55 to get more training data 1-21 for the goal Change Alarm with intent "change name," or gives the source 1-44 a task to improve labels 1-22 or label guideline 1-20 with respect to the goal Change Alarm with intent "change name."

FIG. 6B, FIG. 6C, FIG. 6D, FIG. 6E and FIG. 6F illustrate video screens presented to the user as visual presentation 1-61 corresponding to the visual information of FIG. 6A.

Figures 6B, 6C, 6D, 6E, 6F:
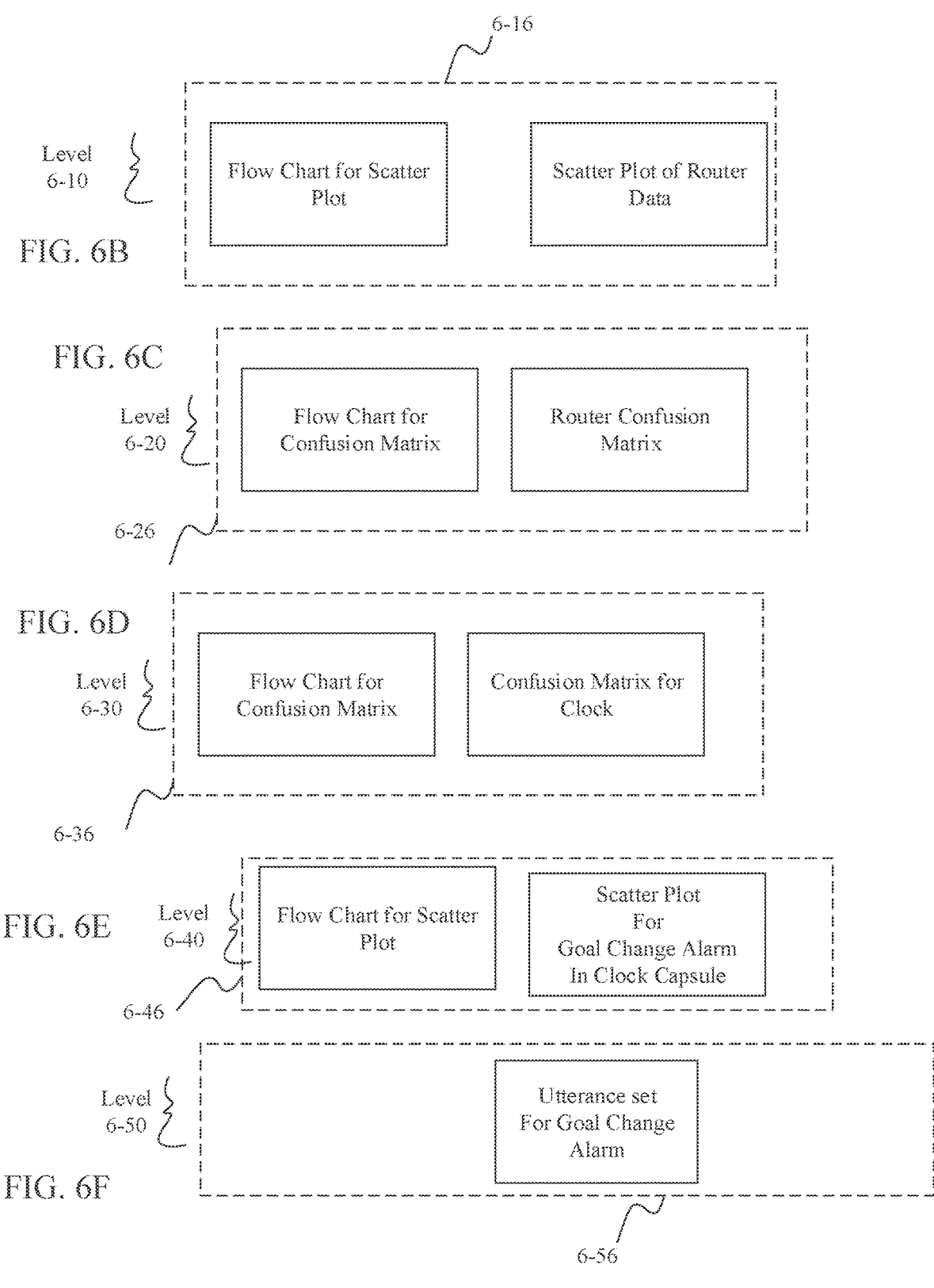
FIG. 6B, FIG. 6C, FIG. 6D, FIG. 6E and FIG. 6F illustrate video screens presented to the user corresponding to the visual information of FIG. 6A, according to some embodiments.

FIG. 6B illustrates a video screen 6-16 including a flow chart for a scatter plot (for example FIG. 4) and a scatter plot of router data (for example FIG. 3A).

FIG. 6C illustrates a video screen 6-26 including a flow chart for a confusion matrix (for example FIG. 5) and a router confusion matrix (for example FIG. 3B).

FIG. 6D illustrates a video screen 6-36 including a flow chart for a confusion matrix (for example FIG. 5) and a confusion matrix for a Clock capsule (for example FIG. 8).

FIG. 6E illustrates a video screen 6-46 including a flow chart for a scatter plot (for example FIG. 4) and a scatter plot for the goal "Change Alarm" (similar to FIG. 3A).

FIG. 6F illustrates an utterance set for the goal "Change Alarm," (similar to Tables 2, 6 and 7).

FIG. 7 illustrates a leaderboard, which is visual presentation of statistical performance of capsules of the ML model 1-3.

FIG. 8 illustrates a simplified confusion matrix for the clock capsule from the leaderboard of FIG. 7, according to some embodiments.

FIG. 10 illustrates further information provided to the development person to help identify weaknesses in the machine learning model.

Figure 11:
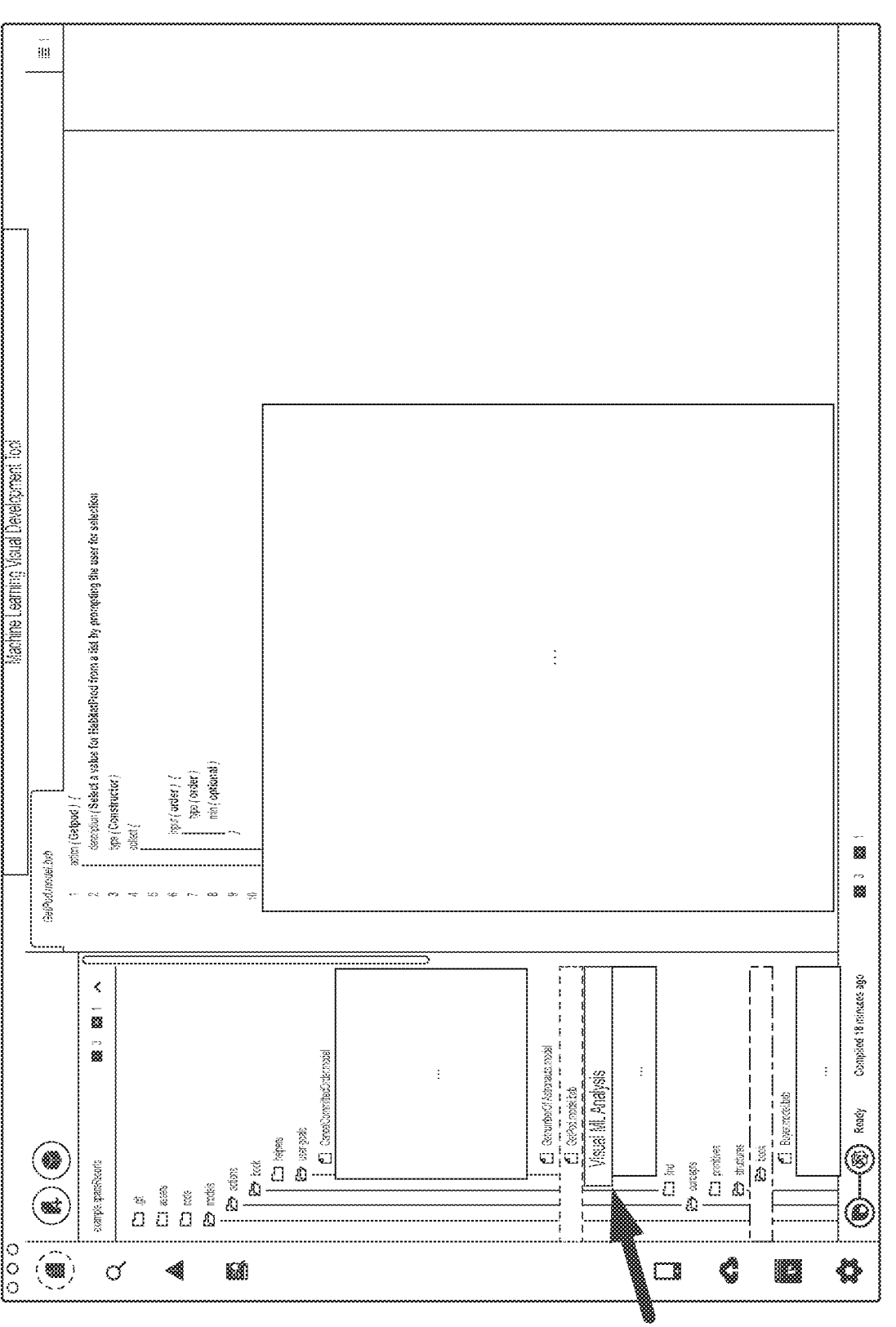
FIG. 11 illustrates an interactive development environment (IDE) screen used to invoke the visual tool, according to some embodiments.

FIG. 11 illustrates an interactive development environment (IDE) screen used to invoke the visual tool. The logic, scatter plots, confusion matrices, utterances and user interface (FIGS. 3A, 3B, 4, 5, 6A, 6B, 6C, 6D, 6E, 6F, 7, 8 and 9) are brought up by development person 1-2, for example, by clicking on the tab labelled "ML Visual Analysis" in the Machine Learning Visual Development Tool of FIG. 11 (see arrow on FIG. 11). An example tool platform in which embodiments can be included is "Bixby" from Samsung Electronics Co., Ltd., of Seoul, Republic of Korea.

Figure 12:
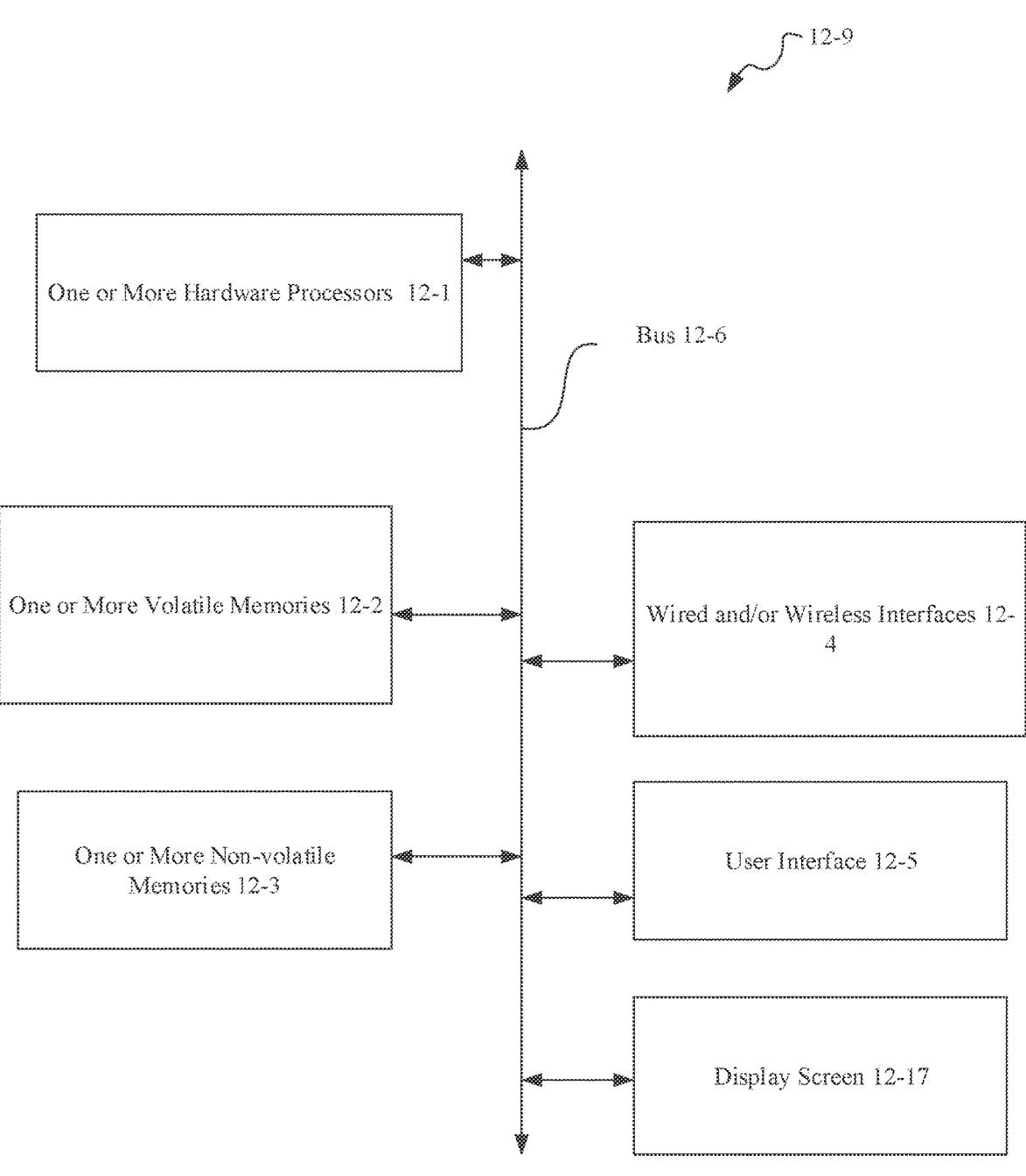
FIG. 12 illustrates an apparatus for implementation of the visual tool, implementation of a classifier engine, a server and/or implementation of a subscriber device, according to some embodiments.

FIG. 12 illustrates an exemplary apparatus for implementation of the embodiments disclosed herein. The apparatus may be a server, a computer, a laptop computer, a handheld device, or a tablet computer device, for example. The apparatus may include one or more hardware processors 12-1. The one or more hardware processors 12-1 may include an ASIC (application specific integrated circuit), CPU (for example CISC or RISC device), and/or custom hardware. The apparatus also may include a user interface 12-5 (for example a display screen and/or keyboard and/or pointing device such as a mouse). The apparatus may include one or more volatile memories 12-2 and one or more non-volatile memories 12-3. The one or more non-volatile memories 12-3 may include a non-transitory computer readable medium storing instructions for execution by the one or more hardware processors 12-1 to cause the apparatus to perform any of the methods of embodiments disclosed herein.

What is claimed is:

1. A system for improving a statistical performance of a machine learning model, the system comprising:

one or more processors; and one or more memories storing instructions configured to cause the one or more processors to:

display, on a visual debugger screen, a first entity including a first chart and a second entity including a scatter plot, wherein the first chart is a flow chart including instructions for a user;

receive a first user input of the user on the first entity or the second entity and update the visual debugger screen in response to the first user input, wherein the first user input is based on the first chart;

display, on the visual debugger screen, a second chart and a confusion matrix, and receive a second input, wherein the second input is configured to cause improvement of one or more performance parameters determining the statistical performance of the machine learning model, wherein the first chart instructs the user to view the scatter plot, and the second chart instructs the user to make a selection of an off-diagonal entry of the confusion matrix with a largest entry, wherein the one or more processors are further configured to present, in response to the selection of the largest entry, first detailed data including a first wrongly-classified task.

2. The system of claim 1, wherein the scatter plot includes a plurality of a particular shape, wherein a first shape of the plurality of the particular shape is associated with a first task of the machine learning model, the first shape plotted at an abscissa value corresponding to a first recall performance of the first task, the first shape is plotted at an ordinate value corresponding to a first precision performance of the first task, and a size of the first shape corresponds to a first number of training instances in a first data set, wherein the machine learning model has been trained to perform the first task using the first data set.

3. The system of claim 2, wherein the first chart is associated with a plurality of tasks of the machine learning model.

4. The system of claim 3, wherein the first chart instructs the user to increase the first number of training instances if the first recall performance is below a first threshold or the first precision performance is below a second threshold.

5. The system of claim 4, wherein the second threshold is equal to the first threshold.

6. The system of claim 4, wherein the first threshold is 0.75.

7. The system of claim 3, wherein the confusion matrix is associated with the plurality of tasks of the machine learning model.

8. The system of claim 1, wherein the second chart instructs the user, responsive to the first wrongly-classified task being associated with correct labels, to retrain the machine learning model after increasing a complexity of the machine learning model.

9. The system of claim 1, wherein the second chart instructs the user, responsive to the first wrongly-classified task being associated with incorrect labels, to retrain the machine learning model after obtaining a second training set.

10. The system of claim 1, wherein the one or more performance parameters include a first parameter, a second parameter, a third parameter or a fourth parameter of the machine learning model, and the first parameter is a data set size of a data set, the second parameter is a label set associated with the data set, the third parameter is a label guideline document and the fourth parameter is a complexity of the machine learning model.

11. The system of claim 1, wherein the instructions are further configured to cause the one or more processors to display, on the visual debugger screen, the first entity including the first chart and a feedback screen.

12. A method for improving a statistical performance of a machine learning model, the method comprising:

displaying, on a visual debugger screen, a first entity including a first chart and a second entity including a scatter plot, wherein the first chart is a flow chart including instructions for a user;

receiving a first user input of the user on the first entity or the second entity and updating the visual debugger screen in response to the first user input, wherein the first user input is based on the first chart;

displaying, on the visual debugger screen, a second chart and a confusion matrix;

receiving a second input, wherein the second input is configured to cause improvement of one or more performance parameters determining the statistical performance of the machine learning model, wherein the first chart instructs the user to view the scatter plot, and the second chart instructs the user to make a selection of an off-diagonal entry of the confusion matrix with a largest entry; and presenting, in response to the selection of the largest entry, first detailed data including a first wrongly-classified task.

13. The method of claim 12, wherein the scatter plot includes a plurality of a particular shape, wherein a first shape of the plurality of the particular shape is associated with a first task of the machine learning model, the first shape plotted at an abscissa value corresponding to a first recall performance of the first task, the first shape is plotted at an ordinate value corresponding to a first precision performance of the first task, and a size of the first shape corresponds to a first number of training instances in a first data set, wherein the machine learning model has been trained to perform the first task using the first data set.

14. The method of claim 13, wherein the first chart is associated with a plurality of tasks of the machine learning model.

15. The method of claim 14, wherein the first chart instructs the user to increase the first number of training instances if the first recall performance is below a first threshold or the first precision performance is below a second threshold.

16. A non-transitory computer readable medium storing instructions, the instructions configured to cause one or more processors of a computer to perform a method for improving a statistical performance of a machine learning model, the method comprising:

displaying, on a visual debugger screen, a first entity including a first chart and a second entity including a scatter plot, wherein the first chart is a flow chart including instructions for a user;

receiving a first user input of the user on the first entity or the second entity and updating the visual debugger screen in response to the first user input, wherein the first user input is based on the first chart;

displaying, on the visual debugger screen, a second chart and a confusion matrix;

receiving a second input, wherein the second input is configured to cause improvement of one or more performance parameters determining the statistical performance of the machine learning model, wherein the first chart instructs the user to view the scatter plot, and the second chart instructs the user to make a selection of an off-diagonal entry of the confusion matrix with a largest entry; and presenting, in response to the selection of the largest entry, first detailed data including a first wrongly-classified task.

\* \* \* \* \*